United States Patent
Monroy-Hernández

(10) Patent No.: US 11,295,101 B2
(45) Date of Patent: *Apr. 5, 2022

(54) PRODUCT VERIFICATION IN A MESSAGING SYSTEM

(71) Applicant: Snap Inc., Santa Monica, CA (US)

(72) Inventor: Andrés Monroy-Hernández, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/934,305

(22) Filed: Jul. 21, 2020

(65) Prior Publication Data
US 2021/0097245 A1    Apr. 1, 2021

Related U.S. Application Data

(63) Continuation of application No. 16/588,524, filed on Sep. 30, 2019, now Pat. No. 10,755,061.

(51) Int. Cl.
*G06K 7/14* (2006.01)
*G06K 7/10* (2006.01)
(Continued)

(52) U.S. Cl.
CPC ....... *G06K 7/10712* (2013.01); *G06K 7/1413* (2013.01); *H04L 67/42* (2013.01);
(Continued)

(58) Field of Classification Search
None
See application file for complete search history.

(56) References Cited

U.S. PATENT DOCUMENTS

2018/0349695 A1* 12/2018 Le Henaff ............... G06T 5/006
2019/0034897 A1* 1/2019 Gao ..................... G07G 1/0036
(Continued)

FOREIGN PATENT DOCUMENTS

CN    108830626 A  * 11/2018

OTHER PUBLICATIONS

"U.S. Appl. No. 16/588,524, Notice of Allowance dated Apr. 16, 2020", 10 pgs.

(Continued)

*Primary Examiner* — Kristy A Haupt
(74) *Attorney, Agent, or Firm* — Schwegman Lundberg & Woessner, P.A.

(57) ABSTRACT

The subject technology analyzes image data to recognize an object corresponding to an identification indicator of a physical item. The subject technology extracts verification metadata from the identification indicator, the verification metadata including information for verifying whether the physical item is an authentic item. The subject technology receives manufacturer verification information based at least in part on the verification metadata. The subject technology receives provenance information associated with the physical item based at least in part on the manufacturer verification information and the verification metadata. The subject technology causes display of a media overlay including the physical item based at least in part on the provenance information, wherein the media overlay includes an indication of authenticity of the physical item.

17 Claims, 18 Drawing Sheets

(51) Int. Cl.
*H04L 29/06* (2006.01)
*H04L 67/01* (2022.01)
*G01S 19/42* (2010.01)
*G06F 3/14* (2006.01)
*H04L 29/08* (2006.01)
*H04L 67/02* (2022.01)

(52) U.S. Cl.
CPC ............... *G01S 19/42* (2013.01); *G06F 3/14* (2013.01); *H04L 67/02* (2013.01)

(56) References Cited

U.S. PATENT DOCUMENTS

| | | |
|---|---|---|
| 2019/0147653 A1 | 5/2019 | Henderson et al. |
| 2019/0362554 A1 | 11/2019 | Chen et al. |
| 2020/0066050 A1 | 2/2020 | Ha et al. |

OTHER PUBLICATIONS

U.S. Appl. No. 16/588,524, filed Sep. 30, 2019, Product Verification in a Messaging System.

* cited by examiner

PRODUCT VERIFICATION IN A MESSAGING SYSTEM

CROSS-REFERENCE TO RELATED APPLICATIONS

This application is a continuation of U.S. Non-Provisional patent application Ser. No. 16/588,524, filed on Sep. 30, 2019, which is hereby incorporated by reference in its entirety for all purposes.

BACKGROUND

This application relates generally to verification, utilizing electronic devices, of physical products. Counterfeiting, and other intellectual property infractions by manufacturers of illegitimate consumer products remains a problem throughout the world, especially with the rise of globalized trade and commerce.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
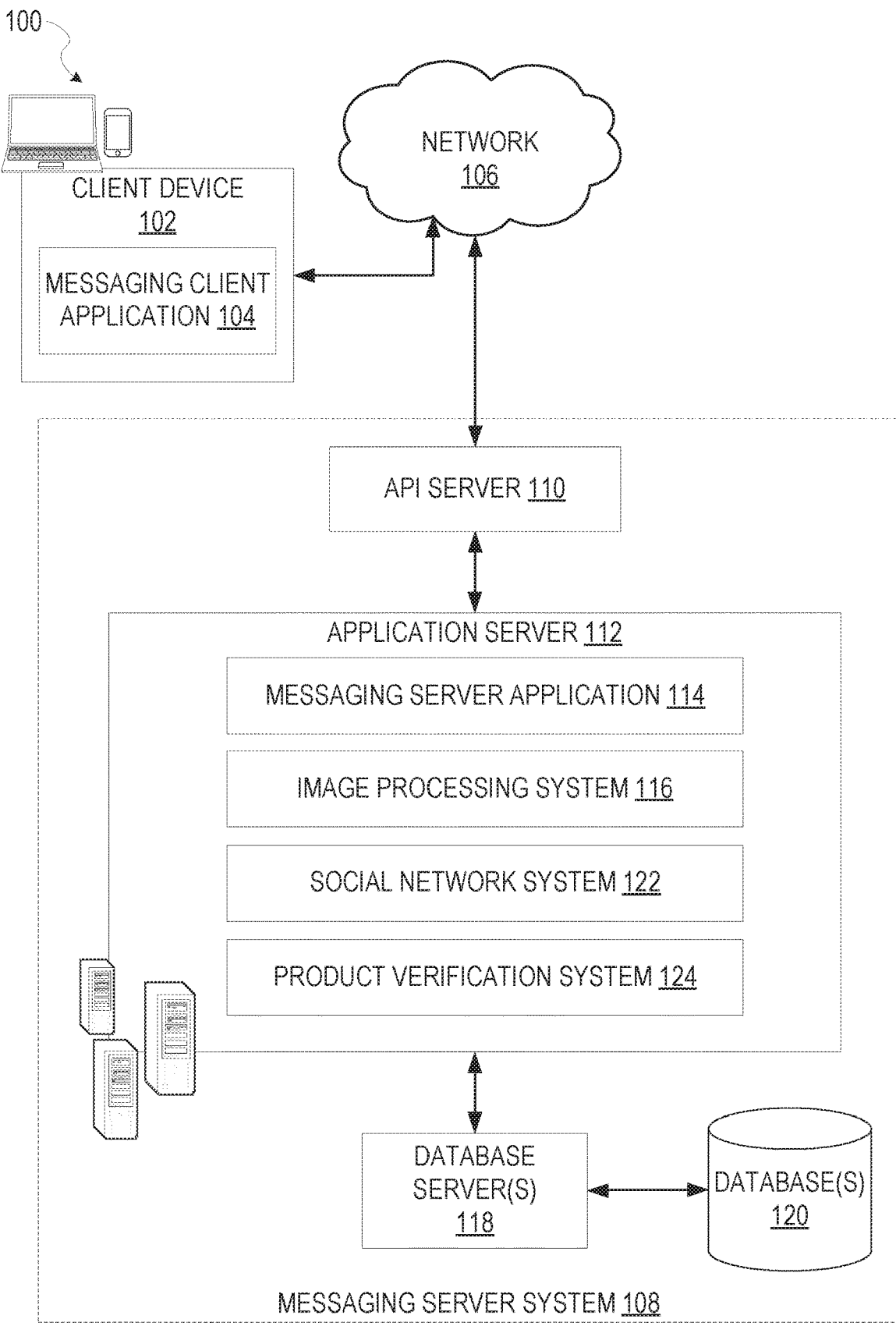
FIG. 1 is a diagrammatic representation of a networked environment in which the present disclosure may be deployed, in accordance with some example embodiments.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Client Device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Ephemeral Message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

With the increased use of digital images, affordability of portable computing devices, availability of increased capacity of digital storage media, and increased bandwidth and accessibility of network connections, digital images have become a part of the daily life for an increasing number of people. Users with a range of interests from various locations can capture digital images of various subjects and make captured images available to others via networks, for example the Internet. For enhancing users' experiences with digital images and providing various features, enabling computing devices to identify various objects and/or features captured in a wide range of changing conditions (e.g., changes in image scales, noises, lighting, movement, or geometric distortion) can be challenging and computationally intensive. In an aspect, the subject technology provides an improved system for recognizing objects in captured image data for the purposes of verifying authenticity of such objects as described further herein.

Counterfeiting, and other intellectual property infractions by manufacturers of illegitimate consumer products remains a problem throughout the world, especially with the rise of globalized trade and commerce. The complexity, quality, and variety of products produced through three-dimensional printing and on-demand manufacturing continues to increase thereby potentially exacerbating this problem. Determining through visual inspection alone whether a product has been unlawfully manufactured or whether a product has been stolen can be difficult. Further, image matching techniques, alone, used to determine whether two images contain the same content (e.g., for the purpose of determining authenticity and/or lawful possession) may have mixed results as the quality of counterfeit products and/or manufacturing processes improve. Consequently, consumers and/or manufacturers may find useful an efficient and improved system to determine whether a product is authentic and in the possession of its rightful owner or other authorized seller.

Messaging systems are frequently utilized, and are increasingly leveraged by users of mobile computing devices, in various settings, to provide different types of functionality in a convenient manner. As described herein, the subject messaging system provides a practical application that enables verification of physical items or products based on image data captured by a given client device (e.g., mobile computing device) and provided to the subject messaging system for analysis. In particular, a given user of the subject messaging system can capture an image or set of images of a physical item that includes a physical identification indicator, such as a barcode, that may identify the physical item. The image data may include a representation of the physical identification indicator, which as described further herein may be a two dimensional (2D) barcode or, in some instances, a three dimensional (3D) object corresponding to a type of 3D barcode. The subject messaging system extracts verification metadata from the physical identification indicator, and performs a verification process to determine the authenticity of the physical item based on the verification metadata, while leveraging the capabilities of the subject message system. Upon being verified, the subject messaging system can render a media overlay in a scene with the physical item to indicate that the physical item is authentic, provide manufacture information, and/or provide provenance information for the physical item (e.g., a history of ownership and/or information indicating the authenticity of a particular physical item).

FIG. 1 is a block diagram showing an example of a messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116, a social network system 122, and a product verification system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
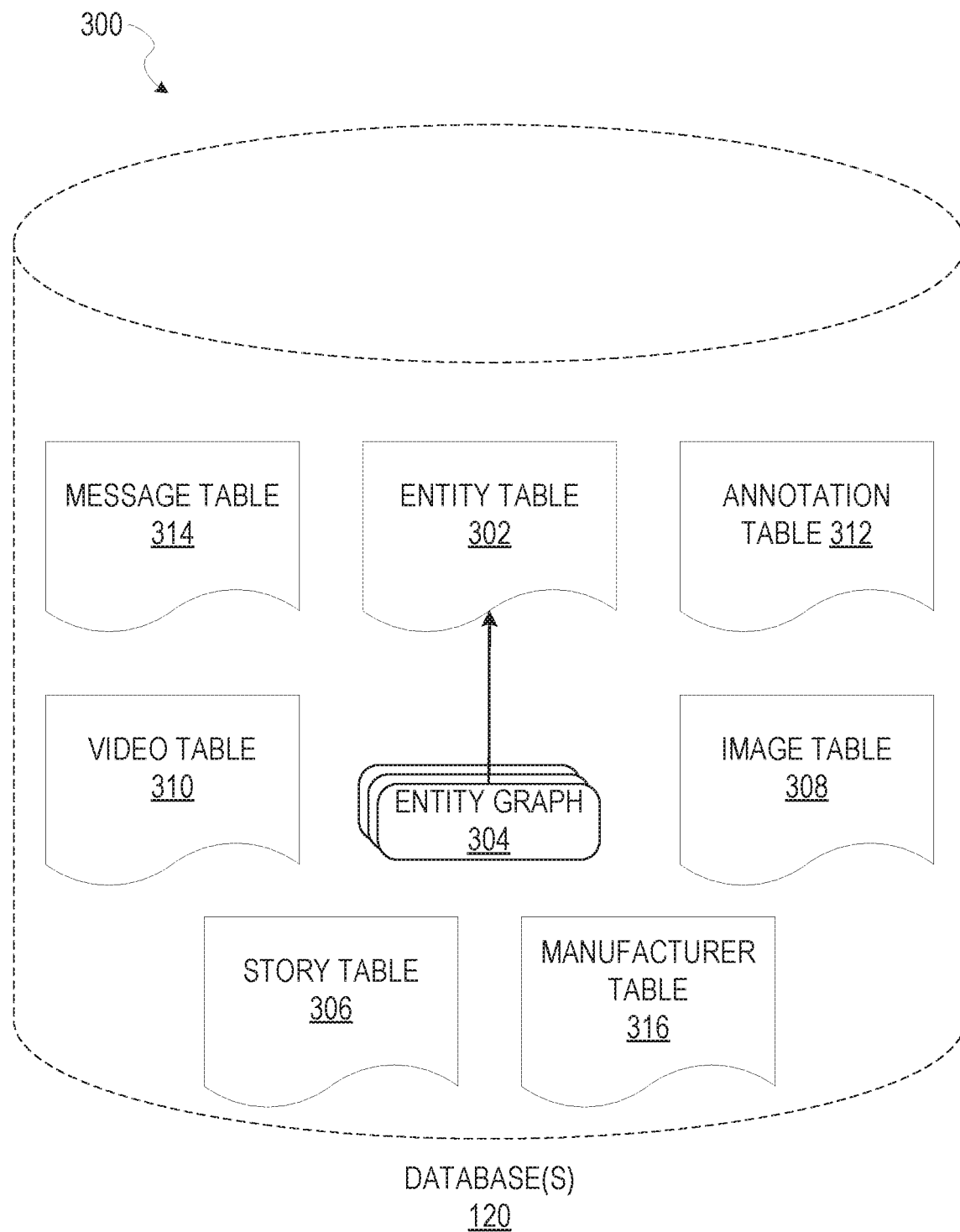
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

The product verification system 124 performs operations for verifying products based at least on image data of such products provided by the messaging client application 104. In an embodiment, the product verification system 124 may store information (e.g., metadata) related to manufacturers of such products, and information utilized for verifying the authenticity of the products, in the database 120. The product verification system 124 is discussed in further detail with respect to FIG. 6 below, and examples of information for product verification are described in FIG. 8, FIG. 9, and FIG. 10 below.

Figure 2:
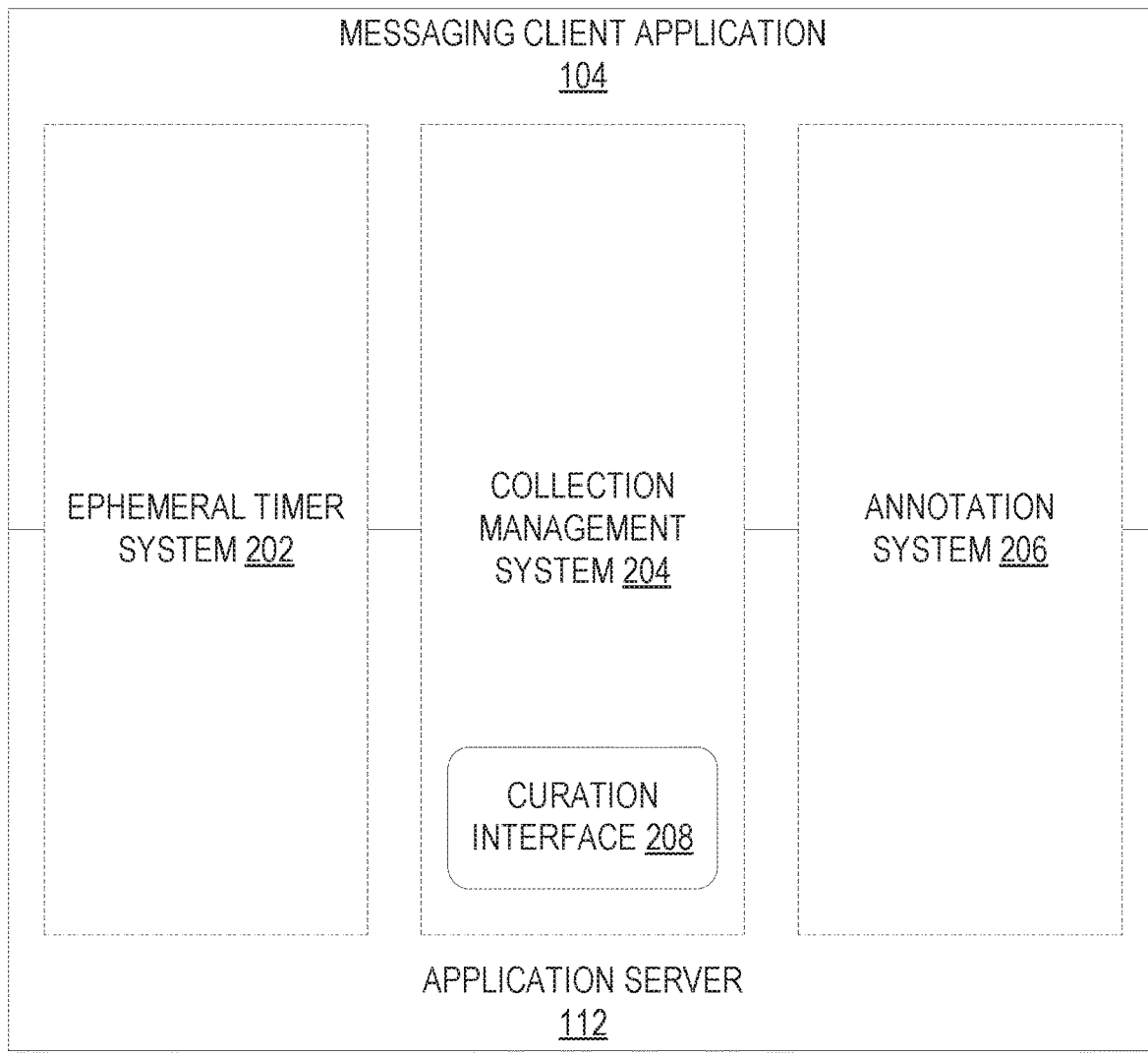
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

The database 120 also stores manufacturer data of products in a manufacturer table 316, which enables the client device 102 to perform verification operations to verify a product (e.g., physical item) based on image data captured by the client device 102. In an example, the manufacturer table 316 includes a directory (e.g., listing) of respective manufacturers and their associated manufacturer identifiers, which can be compared against verification metadata provided by the client device 102. Further, the manufacturer table 316 can also include information for a verification address (e.g., Uniform Resource Locator (URL)) and verification parameters which can be provided to the client device 102 to use as part of completing a verification process of the product. As described further herein, the client device 102 can perform a set of image, text, and/or object recognition processes to extract verification metadata from captured image data in which the image data can include a representation of a physical item corresponding to a product and a physical identification indicator (e.g., a barcode) corresponding to the physical item. Such verification metadata, as described further below, include a manufacturer identifier, a product identifier, and/or a item unique identifier, which can be utilized as part of a verification process for a given physical item.

Figure 4:
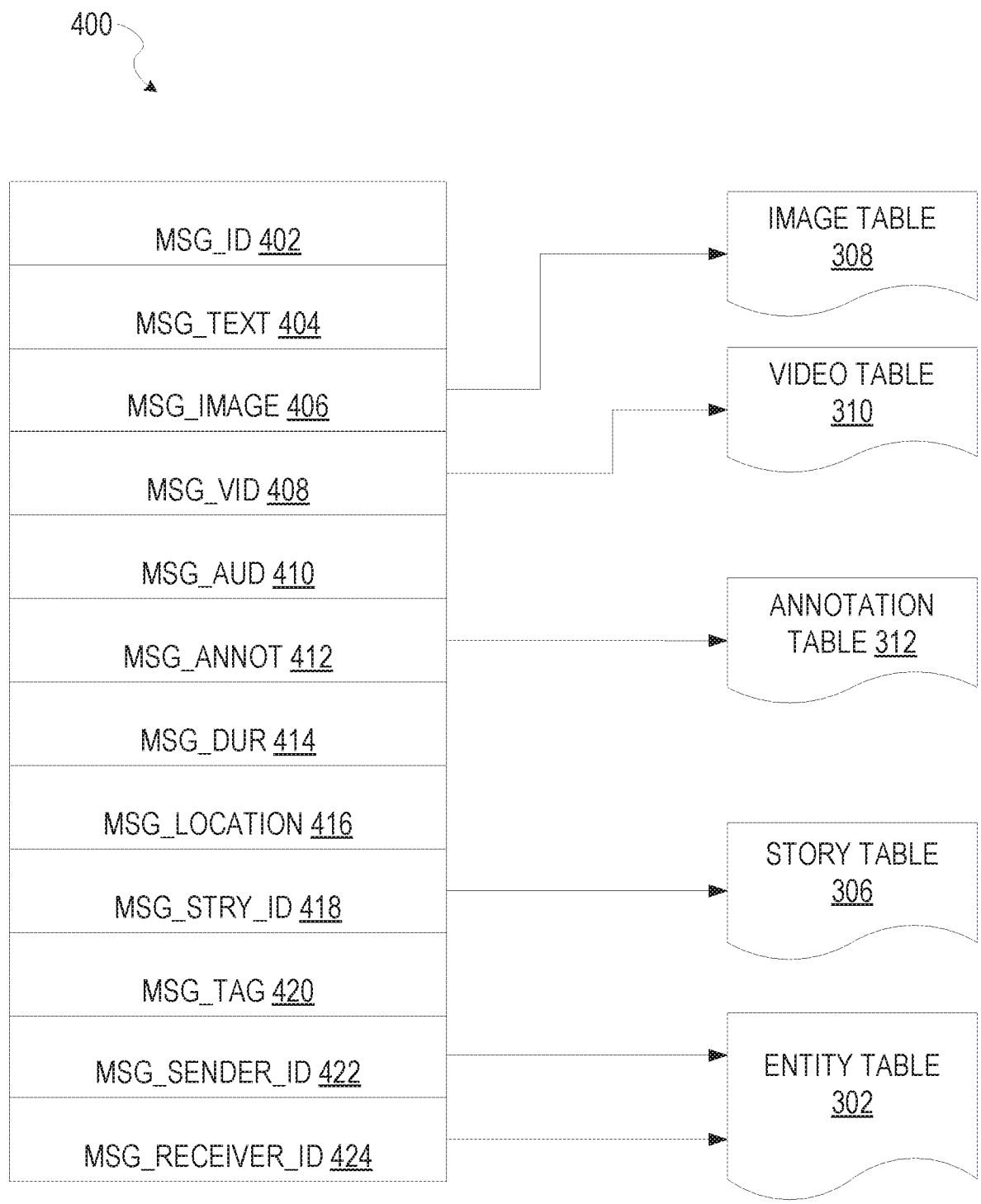
FIG. 4 is a diagrammatic representation of a message, in accordance with some example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
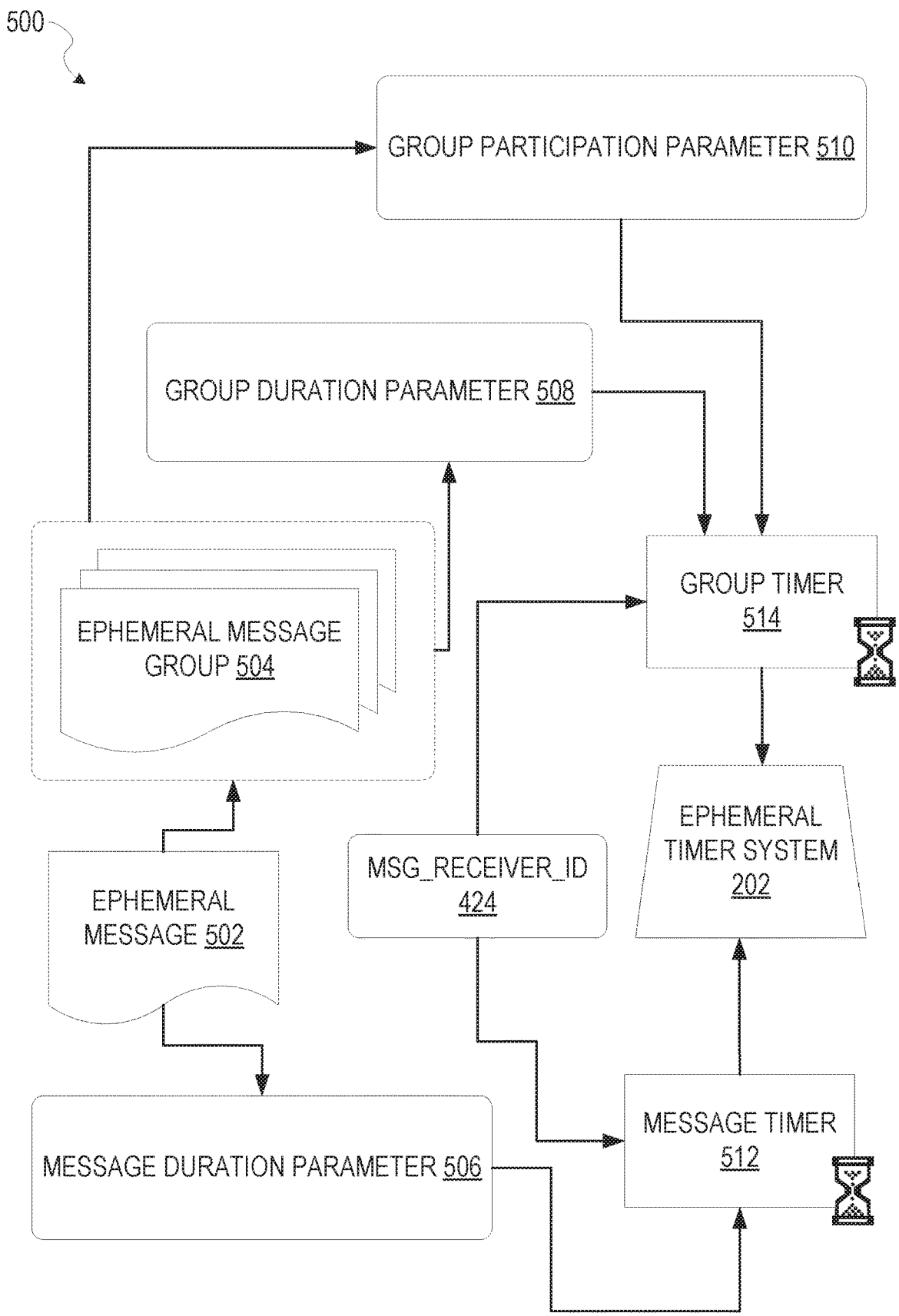
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized implementation of the ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
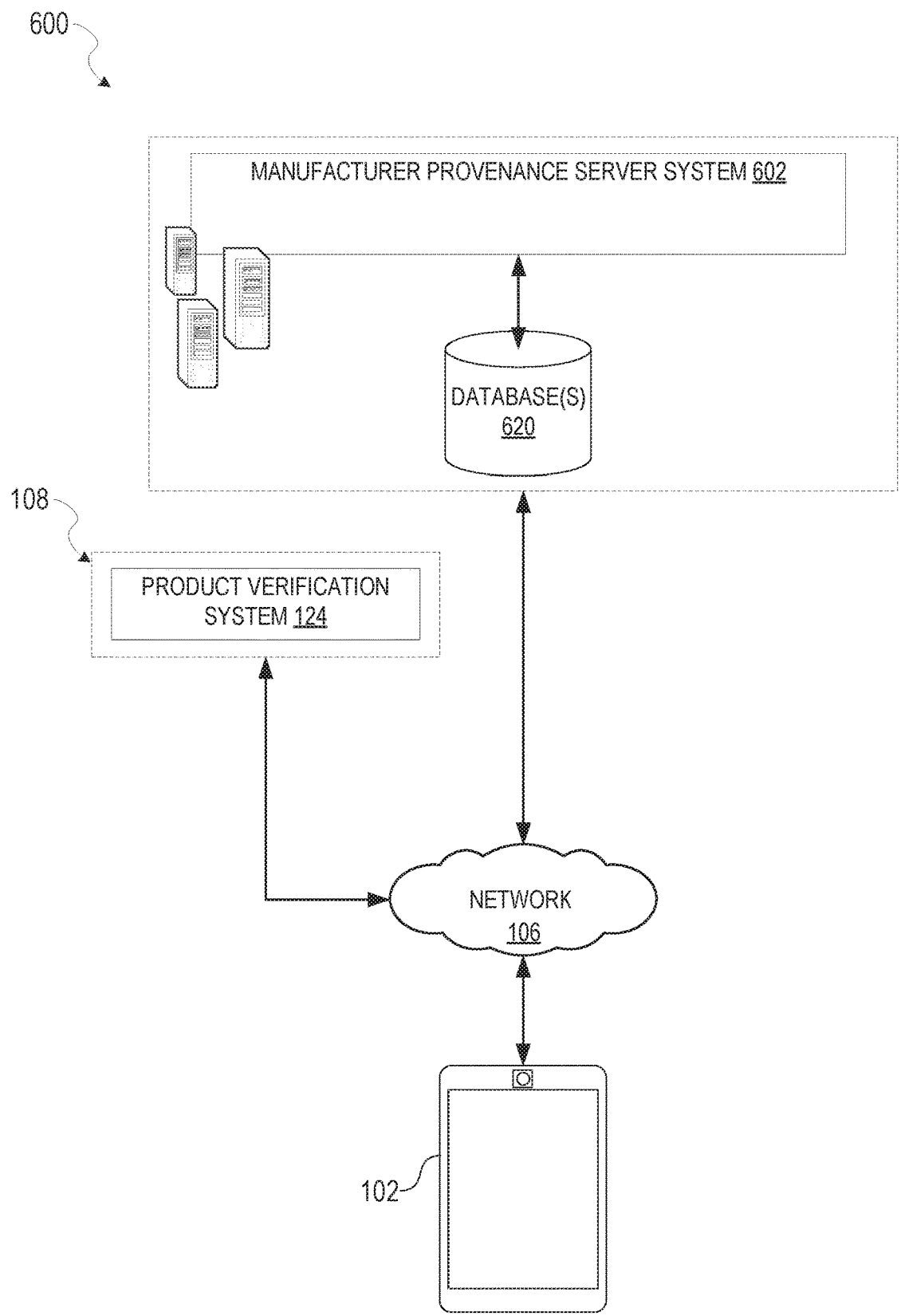
FIG. 6 is a block diagram showing an example network environment for verification of products (e.g., physical items), including portions of the messaging system discussed above in FIG. 1, according to some example embodiments.

FIG. 6 is a block diagram showing an example network environment 600 for verification of products (e.g., physical items), including portions of the messaging system 100 discussed above in FIG. 1, according to some example embodiments. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

For explanatory purposes, the network environment 600 is illustrated in FIG. 6 as including the client device 102, the messaging server system 108, and a manufacturer provenance server system 602; however, the network environment 600 may include any number of electronic devices and any number of servers or a data center including multiple servers in some embodiments.

In one or more implementations, the network 106 may be an interconnected network of electronic devices that may include, or may be communicatively coupled to, the Internet. The network 106 may communicatively (directly or indirectly) couple, for example, the client device 102 with the messaging server system 108 and/or the manufacturer provenance server system 602.

The messaging server system 108 and/or the manufacturer provenance server system 602 may be part of a network of computers or a group of servers, such as in a cloud computing or data center implementation. The messaging server system 108 and/or the manufacturer provenance server system 602 store or generate information that are requested and/or received by the client device 102 as described below and further in FIG. 9 and FIG. 10 below.

As illustrated, the client device 102, which hosts a number of applications including the messaging client application 104 as described before in FIG. 1, is communicatively coupled to other instances of the messaging client application 104 (e.g., on another client device 102), and the messaging server system 108 via the network 106. The messaging server system 108 includes the product verification system 124 as described above in FIG. 1.

In an example embodiment, the client device 102 may provide image data including a representation of a physical item (e.g., captured using a camera provided by the client device 102) including an identification indicator (e.g., a physical barcode, etc.) of the physical item, and analyze the image data to extract information (e.g., verification metadata from the barcode) from the identification indicator. The extracted information may include a manufacturer identifier (ID), a product ID, and/or an item unique ID (e.g., unique serial number, etc.). Further, in an embodiment, the identification indicator is in the form of a 3D object (e.g., 3D barcode) located within the proximity or included with the physical item as described in more detail in FIG. 13 below.

The product verification system 124 can receive the aforementioned extracted information from the client device 102, and determine additional manufacturer information (e.g., manufacturer verification metadata) to validate the authenticity of the physical item. As referred to herein, authenticity of a given physical item may be verified based at least in part on a set of signals (e.g., provided by the client device 102 and/or the product verification system 124) including information that respective manufacturers have maintained regarding individual products including, but not limited to, barcodes, Universal Product Code (UPC) codes, QR codes, Snapcodes™, unique individual serial numbers, stock keeping unit numbers, vehicle identification numbers, European article numbers (EAN), international standard book numbers (ISBN), manufacturer part numbers (MPN), global trade item number (GTIN), Japanese article numbers (JAN), watermarks, and the like. Other signals that may be utilized can include location information (e.g., GPS coordinates to determine a particular reseller or retail, or geographic region corresponding to the physical item), network information (e.g., Wi-Fi network), etc. Further, it is appreciated that the physical item can include a respective physical identification indicator(s) based on one or more of the aforementioned standards or formats for identifying individual products.

The product verification system 124 can receive at least the manufacturer ID from the client device 102, and perform a lookup, search, or select operation on the manufacturer table 316 to retrieve the manufacturer verification metadata from the database 120. In an example embodiment, such manufacturer verification metadata includes a verification link (e.g., verification URL or "V-URL"), and a set of verification parameters (e.g., "V-PARAM"). The product verification system 124 provides the client device 102 with the aforementioned manufacturer verification metadata.

Based at least in part on the received manufacturer verification metadata, the client device 102 can send a request message to a respective server for verifying the physical item. The request message may include, for example, the product ID and/or the item unique ID. In an embodiment, such a server is, as further illustrated in the network environment 600, the manufacturer provenance server system 602. The manufacturer provenance server system 602, in an embodiment, is implemented as an electronic-based service that can be accessed by a given client electronic device, such as the client device 102, based on a request message including the verification URL and the set of verification parameters in a particular message protocol. In response to the request message, the manufacturer provenance server system 602 can verify the physical item based on the information included in the request message. In an example, the manufacturer provenance server system 602 compares the received verification parameters to data in a database 620 that is utilized to verify the authenticity of the physical item. In an embodiment, metadata associated with the physical item is stored in the database 620, which serves for verification of the physical item based on the verification parameters from the request message. Different types of verification schemes can be utilized including determining whether the verification parameters match with the corresponding metadata for the physical item, employing hashing and/or encryption/decryption techniques on the verification parameters and then ensuring consistency with the metadata in the database 620, etc.

In an example embodiment, the manufacturer provenance server system 602 determines whether to provide an endorsement for the physical item. As referred to herein, an "endorsement" provides an indication of a likelihood that the physical item is authentic, and can be in a binary form or encoding (e.g., "Yes", "No", "True", "False", "1", "0"). In another embodiment, an endorsement can be provided as a score value indicating the likelihood that the physical item is authentic (e.g., a value between 0 to 10, a value between 0 to 100, etc.). It is appreciated that other forms of indicating a likelihood of authenticity for a physical item may be provided by the manufacturer provenance server system 602 (e.g., a grading system such as A through F). As mentioned before, the manufacturer provenance server system 602 can determine the likelihood that the physical item is authentic based on a set of signals provided in the request message from the client device 102. Moreover, it is appreciated that different weights may be assigned to each of the respective signals in order to provide the endorsement score. For example, a lesser weight can be assigned to a signal corresponding to a location of the physical item, where the location of the physical item is greater than a predetermined threshold distance from a given location (e.g., an original point of manufacturer) as this indicates a chance the physical item was stolen, or outside of a region that the same types of physical items (e.g., same product model) are sold. Based on the lesser weight, the final score for the endorsement may be reduced.

In response to the request message, the manufacturer provenance server system 602 can provide a response message to the client device 102, which includes, in an example embodiment, information indicating an endorsement, a manufacturer augmented reality (AR) URL (e.g., media content of how the physical item was manufactured), and provenance information such a history or historical record of ownership. Such provenance information includes, in an example embodiment, a list of locations that the physical item has been based on prior provided information, and a list of scans (e.g., other instances of image capture of the physical item) by other users. It is appreciated that the provenance information may not include a complete historical record of where the physical item has been due to imperfect ownership records and/or imperfect previously recorded location information (e.g., where information was failed to be provided due to inaction and/or privacy considerations).

Based on the information in the received response message, the client device 102 can provide for display (e.g., rendering on a UI of the messaging client application 104) a set of media overlay effects and graphical elements, including indications of an endorsement of the physical item, provenance information, etc. Examples are discussed in more detail in the discussion of FIG. 11A, FIG. 11B, and FIG. 12 below.

Further, in an example embodiment, the database 620 is implemented in the form of a blockchain, which enables verification of entries in the database 620 through a distributed and decentralized ledger implementation according to a respective blockchain protocol and consensus algorithm (e.g., proof of work, proof of stake, and the like). In an example blockchain implementation of a database, respective entries in the database (e.g., respective rows) correspond to respective blocks of a blockchain that can be linked to each other using linked lists and/or pointers.

In an embodiment, the client device 102 as described above in FIG. 6 may be, for example, a portable computing device such as a laptop computer, a smartphone, a peripheral device (e.g., a digital camera), a tablet device, a wearable device such as a watch, a band, a headset, and the like, or any other appropriate device. Each of the aforementioned device may also support touchscreen gestures (e.g., through use of a touchscreen) or non-touch gestures (e.g., through use of a gyroscope or motion sensor). In one or more implementations, the client device 102 may support touchscreen-like gestures, such as in a virtual reality or augmented reality environment. In FIG. 6, by way of example, the client device 102 is depicted as a mobile electronic device with a touchscreen. In one or more implementations, the client device 102 may be, and/or may include all or part of, a machine as described below in FIG. 18. The client device 102 may include components that perform operations for verification of physical items as described in further detail in FIG. 7 below.

In an embodiment, the client device 102 is a head mounted portable system, wearable by a user, that includes a system capable of capturing images, audio, videos, multimedia content, and the like, based on a user's surrounding physical environment.

Further, in an embodiment, such a head mounted portable system may include a display system that is capable of presenting a visualization of a mixed reality environment to the user (e.g., head mounted display device) where real and virtual environments are combined in varying degrees to facilitate interactions from a user in a real time manner, including augmented reality that primarily includes real elements and is closer to a real environment than a virtual environment (e.g., without real elements). In this example, a display system of the client device 102 provides a stereoscopic presentation of the mixed reality environment, enabling a three-dimensional visual display of a rendering of a particular scene, to the user. The client device 102 may include various sensors including, but not limited to, cameras, image sensors, touch sensors, microphones, inertial measurement units (IMU), heart rate, temperature, among other types of sensors. Moreover, the client device 102 may include hardware components that can receive user input such as hardware buttons, switches, sliders, etc.

Figure 7:
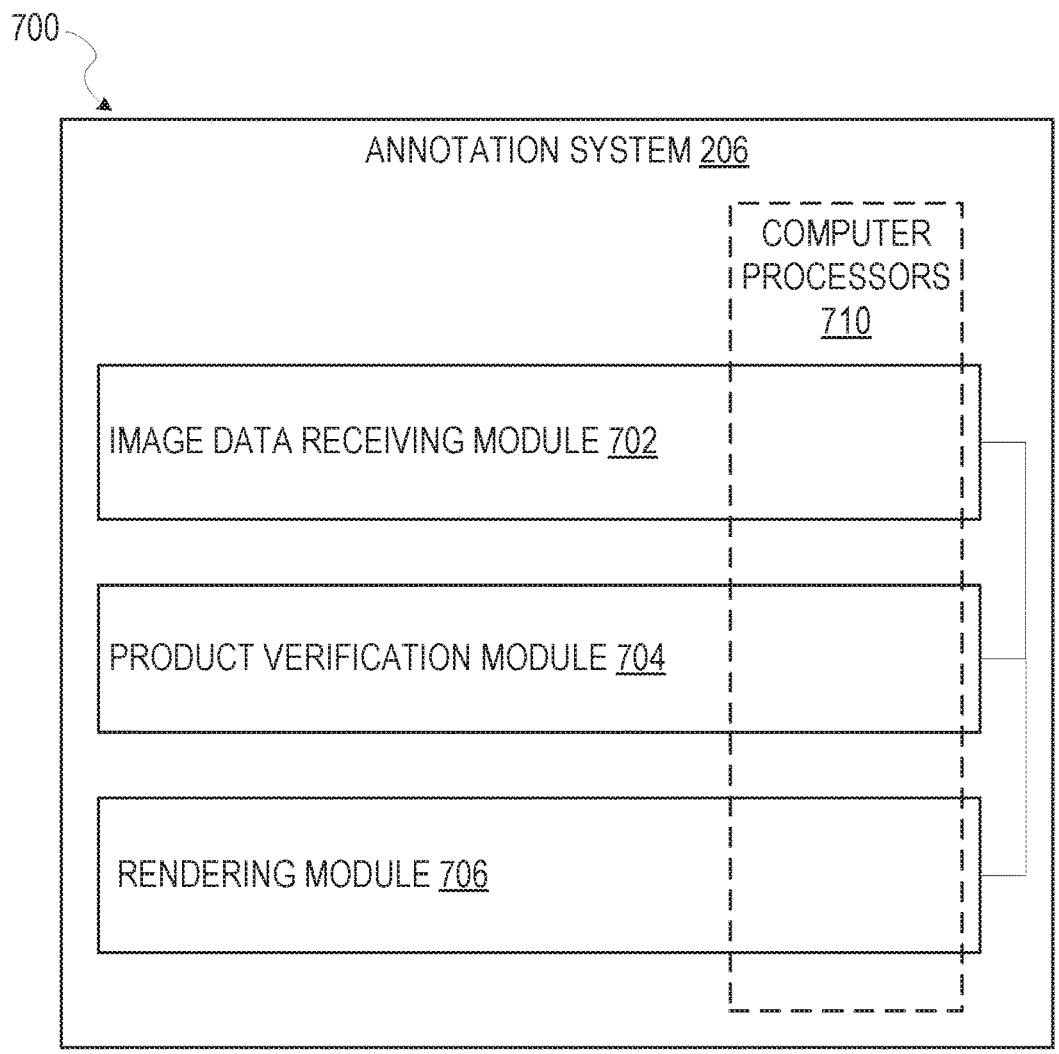
FIG. 7 is a block diagram illustrating various modules of an annotation system, according to certain example embodiments.

FIG. 7 is a block diagram 700 illustrating various modules of an annotation system 206, according to certain example embodiments. The annotation system 206 is shown as including an image data receiving module 702, a product verification module 704, and a rendering module 706. The various modules of the annotation system 206 are configured to communicate with each other (e.g., via a bus, shared memory, or a switch). Any one or more of these modules may be implemented using one or more computer processors 710 (e.g., by configuring such one or more computer processors to perform functions described for that module) and hence may include one or more of the computer processors 710 (e.g., a set of processors provided by the client device 102).

Any one or more of the modules described may be implemented using hardware alone (e.g., one or more of the computer processors 710 of a machine (e.g., machine 1800) or a combination of hardware and software. For example, any described module of the annotation system 206 may physically include an arrangement of one or more of the computer processors 710 (e.g., a subset of or among the one or more computer processors of the machine (e.g., machine 1800) configured to perform the operations described herein for that module. As another example, any module of the annotation system 206 may include software, hardware, or both, that configure an arrangement of one or more computer processors 710 (e.g., among the one or more computer processors of the machine (e.g., machine 1800) to perform the operations described herein for that module. Accordingly, different modules of the annotation system 206 may include and configure different arrangements of such computer processors 710 or a single arrangement of such computer processors 710 at different points in time. Moreover, any two or more modules of the annotation system 206 may be combined into a single module, and the functions described herein for a single module may be subdivided among multiple modules. Furthermore, according to various example embodiments, modules described herein as being implemented within a single machine, database, or device may be distributed across multiple machines, databases, or devices.

The image data receiving module 702 receives images captured by a client device 102. For example, an image is a photograph captured by an optical sensor (e.g., camera) of the client device 102. An image includes one or more real-world features, such a physical object(s) detected in the image. In some embodiments, an image includes metadata describing the image.

The product verification module 704 utilizes different object detection processes to detect objects in the image, such as a physical item corresponding to a product that a user wants to verify its authenticity, and a physical indicator of identification (e.g., barcode) corresponding to the physical item. In an example, imaging processing algorithms and recognition techniques may be used to detect objects of the image. For example, optical character recognition (OCR) can be used as a primary image analysis technique or to enhance other processes. Features (e.g., shape, size, color and text) of the image can be extracted. In some embodiments, image processing processes may include sub-processes such as, for example, thresholding (converting a grayscale image to black and white, or using separation based on a grayscale value), segmentation, blob extraction, pattern recognition, barcode and data matrix code reading, gauging (measuring object dimensions), positioning, edge detection, color analysis, filtering (e.g. morphological filtering) and template matching (finding, matching, and/or counting specific patterns).

Further, the product verification module 704, in an example embodiment, utilizes a set of classifiers that classify an image received from a camera of a mobile computing device into one or more classes. In an embodiment, a first type of image classifier determines whether the image includes a physical identification indicator containing text, barcode pattern(s), and/or QR code pattern(s), and the like. Moreover, a second type of image classifier determines whether the image includes a 3D object corresponding to a physical identification indicator (e.g., 3D barcode) for identifying a product, an example of which is further discussed in FIG. 13. Various techniques (e.g., OCR and other geometric recognition processes) may also be used as the primary or secondary image analysis technique to verify one or more potential objects of the image (e.g., the physical item corresponding to the product, and the physical identification indicator of the physical item).

Figure 14:
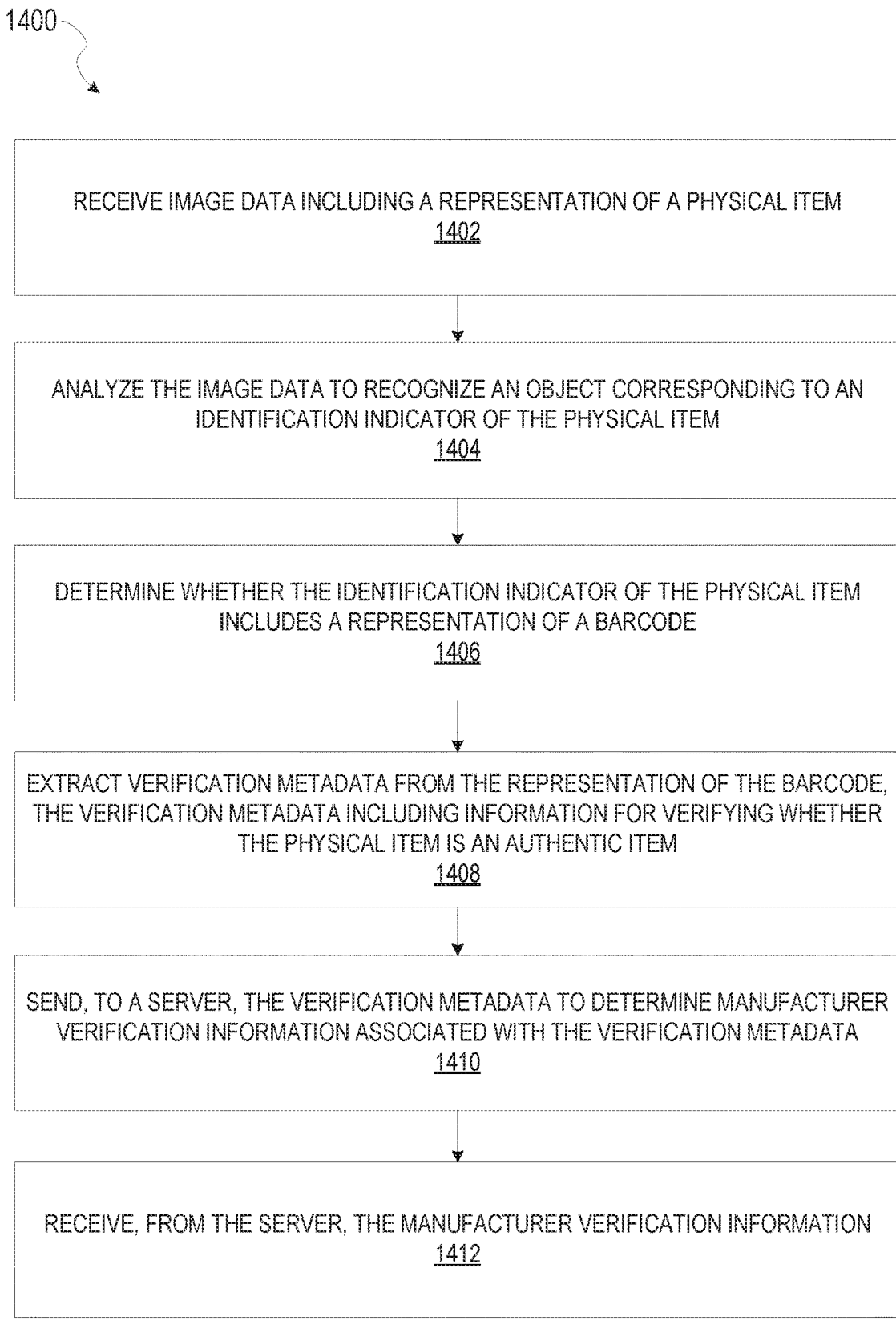
FIG. 14 is a flowchart illustrating a method to extract verification metadata from a physical identification indicator and obtain manufacturer verification information based on the extracted verification metadata, according to certain example embodiments.
Figure 15:
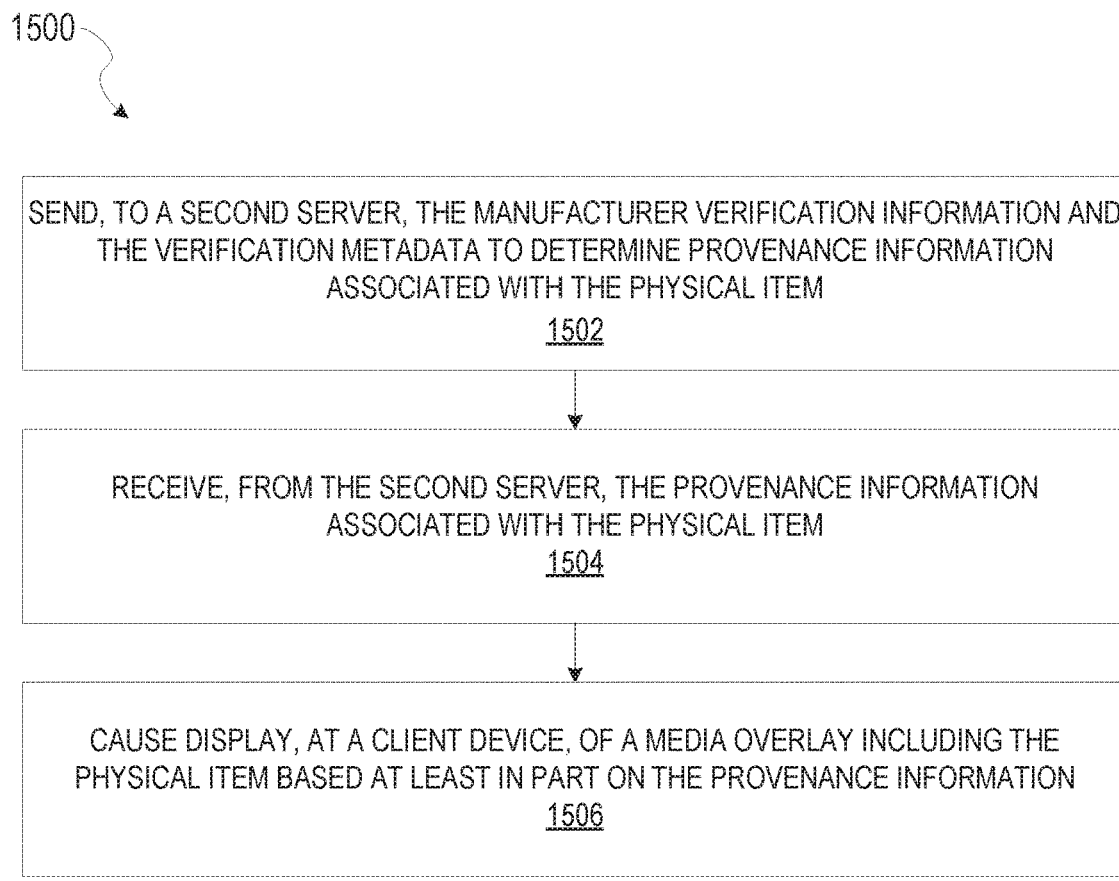
FIG. 15 is a flowchart illustrating a method of requesting provenance information based on manufacturer verification information associated with a given physical item, which may be performed in conjunction with the method in FIG. 14, according to certain example embodiments.

Based at least in part on one of the aforementioned classifications, the product verification module 704 can perform operations (e.g., a process) for extracting verification metadata from a recognized object corresponding to a physical identification indicator of the physical item in the image, and verifying the physical item, which is described further in FIG. 14 and FIG. 15. Further, as part of the verification process, the product verification module 704 may receive manufacturer verification information from the product verification system 124, and provenance information from the manufacturer provenance server system 602 as described herein.

The rendering module 706 performs rendering of content for display by the messaging client application 104 based on data provided by at least one of the aforementioned modules. For example, the rendering module 706 performs various operations based on algorithms or techniques that correspond to animations and/or providing visual and/or auditory effects, based on the manufacturer verification information, to the received image data, which is described further herein.

Figure 8:
FIG. 8 is a schematic diagram illustrating a structure of the message annotations, as described in FIG. 4, including additional information corresponding to verification metadata for verification of a physical item (e.g., product), according to some embodiments.

FIG. 8 is a schematic diagram illustrating a structure of the message annotations 412, as described in FIG. 4, including additional information corresponding to verification metadata for verification of a physical item (e.g., product), according to some embodiments. In particular, the additional information corresponds to extracted verification metadata as described before where the client device 102 extracts such information from a given physical identification indicator (e.g., barcode, etc.) from captured image data including a representation of the physical identification indicator corresponding to a given physical item for verification.

In an embodiment, the content of a particular message 400 including the additional data shown in FIG. 6 is used to populate the message table 314 stored within the database 120 for a given message, which is then accessible by the product verification system 124, and/or the messaging client application 104. As illustrated in an example embodiment, message annotations 412 includes the following components corresponding to data for a message for product verification:

A manufacturer identifier 802: identifier of a manufacturer (e.g., name, brand, etc.) extracted from a physical identification identifier from image data A product identifier 804: identifier of a product (e.g., model number, part number, etc.) extracted from the physical identification identifier from the image data an item unique identifier 806: unique identifier of the physical item (e.g., a unique serial number, other metadata describing unique details regarding the physical item such as how the product was manufactured (e.g., using green or environmentally friendly processes/techniques, percentage of the product that utilizes recycled materials, etc.)

Figure 9:
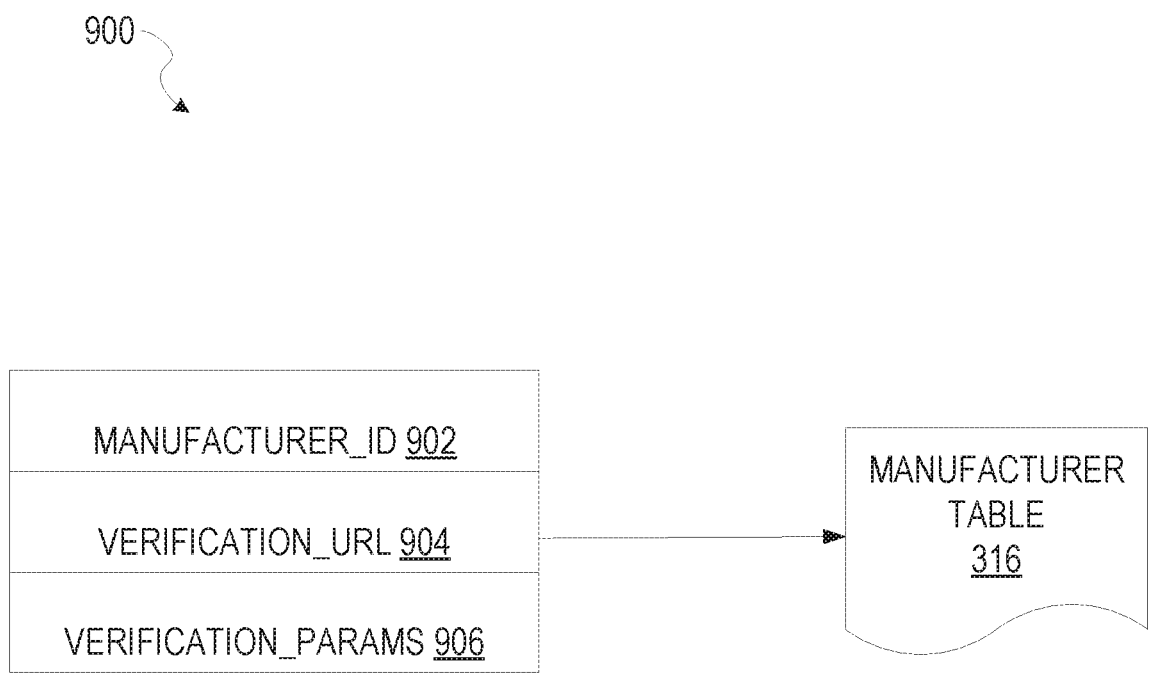
FIG. 9 is a schematic diagram illustrating a structure of manufacturer verification metadata stored in the manufacturer table, as described in FIG. 3, corresponding to manufacturing information for verification of a physical item (e.g., product), according to some embodiments.

FIG. 9 is a schematic diagram illustrating a structure of manufacturer verification metadata 900 stored in the manufacturer table 316, as described in FIG. 3, corresponding to manufacturing information for verification of a physical item (e.g., product), according to some embodiments.

In an embodiment, the data shown in FIG. 9 is used to populate the manufacturer table 316 stored within the database 120, which is then accessible by the product verification system 124, and/or the messaging client application 104. As illustrated in an example embodiment, the manufacturer verification metadata 900 includes the following components corresponding to manufacturer data for product verification:

A manufacturer identifier 902: identifier of a manufacturer (e.g., name, brand, etc.), which can be utilized to compare against the manufacturer identifier 802 discussed in FIG. 8

Figure 10:
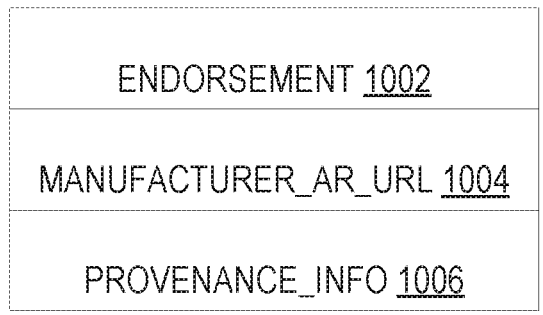
FIG. 10 is a schematic diagram illustrating a structure of provenance metadata stored in the database, as described in FIG. 6, corresponding to information indicating authenticity of a physical item (e.g., product), according to some embodiments.

A verification URL 904: an address (e.g., web address, server address, network address, IP address, and the like) that is utilized for verifying a physical item Verification parameters 906: one or more parameters (e.g., a product identifier, an item unique identifier, other types of parameters such as location information or GPS signals if permitted by a user) that are used in conjunction with the verification URL 904 to verify a physical item FIG. 10 is a schematic diagram illustrating a structure of provenance metadata 1000 stored in the database 620, as described in FIG. 6, corresponding to information indicating authenticity of a physical item (e.g., product), according to some embodiments.

In an embodiment, the data shown in FIG. 10 is used to populate the database 620, which is then accessible by the product verification system 124, and/or the messaging client application 104. As illustrated in an example embodiment, the provenance metadata 1000 includes the following components corresponding to manufacturer data for product verification:

An endorsement 1002: an indication of a likelihood that the physical item is authentic, and can be in a binary form or encoding (e.g., "Yes", "No", "True", "False", "1", "0"), or can be provided as a score value indicating the likelihood that the physical item is authentic (e.g., a value between 0 to 10, a value between 0 to 100, etc.)

A manufacturer augmented reality URL 1004: an address (e.g., web address, server address, network address, IP address, and the like) that references media content related to the physical item and/or including information regarding one or more media overlays, filters, Lenses™, effects, etc., for display in conjunction with the representation of the physical item from captured image data Provenance information 1006: information indicating historical information related to ownership of the physical item (e.g., different names of owners, different ownership period of times for the aforementioned owners, different locations where the physical item was located during the ownership period of times, etc.)

Figure 11A:
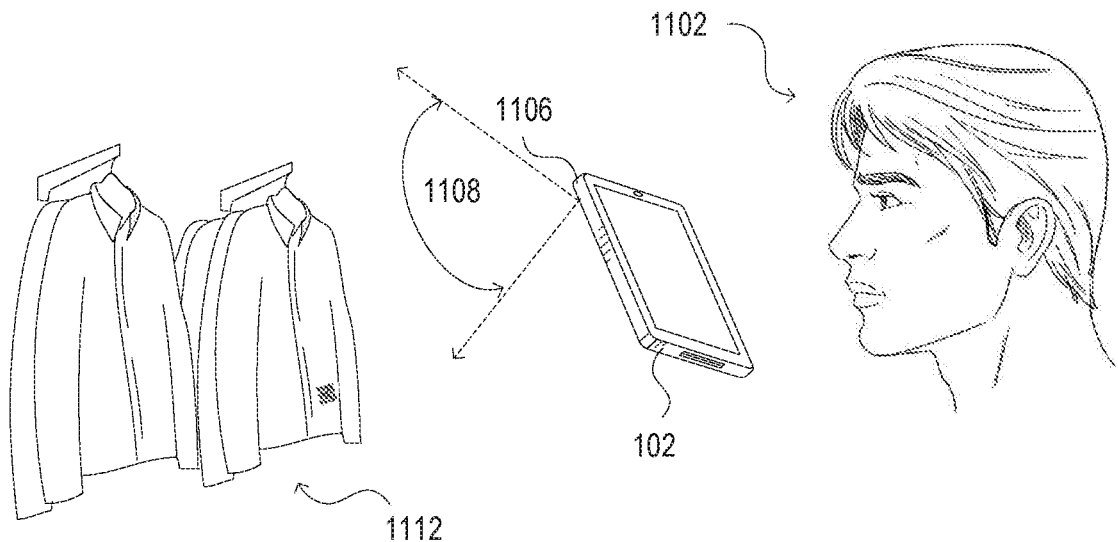
FIG. 11A and FIG. 11B illustrate examples of a user capturing an image of a physical item to submit for verification in the messaging system, according to some embodiments.
Figure 11B:
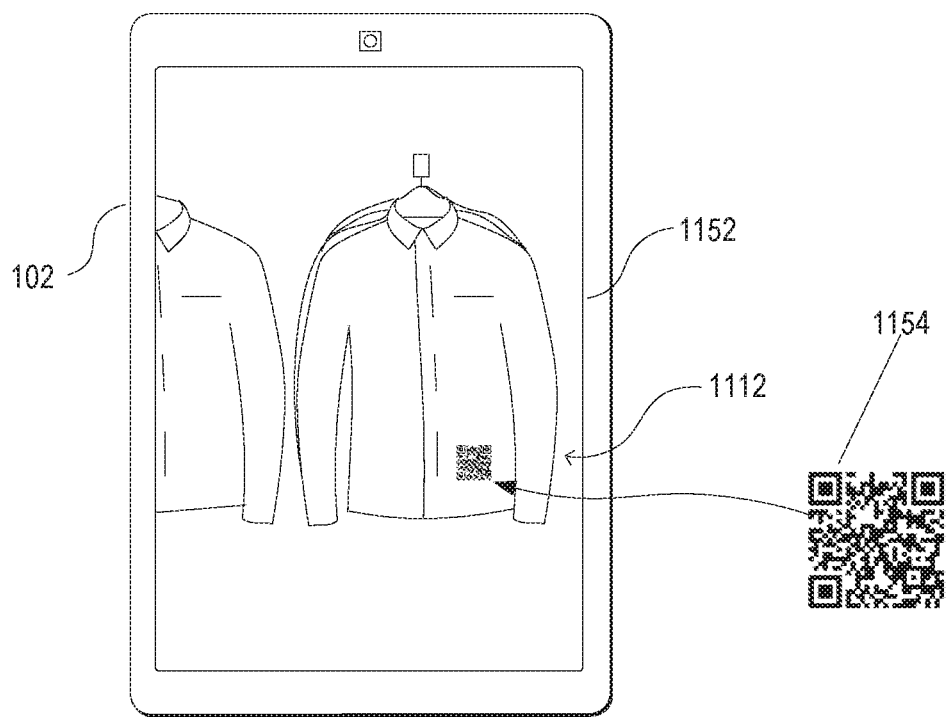

FIG. 11A and FIG. 11B illustrate examples of a user capturing an image of a physical item to submit for verification in the messaging system 100, according to some embodiments.

FIG. 11A illustrates an example situation in which a user 1102 is capturing an image of a physical item in accordance with various embodiments. Although only a portable client device (e.g., the client device 102) is shown in FIG. 11A, it should be understood that various types of electronic or computing devices are capable of capturing, receiving and/or processing images in accordance with various embodiments discussed herein. These client devices can include, for example desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a webbrowser, or a combination of any two or more of these, and the like.

The client device 102 may have at least one camera 1106. Each camera may be, for example, a charge-coupled device (CCD), an active pixel sensor in complementary metaloxide-semiconductor (CMOS) or N-type metal-oxide-semiconductor (NMOS), an infrared or ultrasonic image sensor, or an image sensor utilizing other type of image capturing technologies.

As illustrated in the example of FIG. 11A, the user 1102 can position the client device 102 such that one or more physical objects, including a physical item 1112, are within a field of view 1108 of at least one camera 1106 of the client device 102. The at least one camera 1106 can capture a still image 154, such that a representation of the physical item 1112 with a representation of a physical identification indicator 1154 are displayed on a display screen 1152 of the client device 102, as illustrated in the example of FIG. 11B. In some embodiments, the at least one camera 1106 captures video, providing a "live" view of the captured video information. The image and/or a frame of the video can be analyzed, such as by analyzing on the client device 102 and/or sending across a network (e.g., the network 106) to a server or service (e.g., the messaging server system 108 and/or the image processing system 116) for analyzing image data.

The client device 102 can extract verification metadata (e.g., as described before in FIG. 6, FIG. 7, and FIG. 8) based on the representation of the physical identification indicator 1154. The client device 102 then sends the extracted verification metadata to the product verification system 124 to receive manufacturer verification metadata (e.g., as described before in FIG. 6, FIG. 7, and FIG. 9). Based at least in part on the received manufacturer verification metadata, the client device 102 can send a request to the manufacturer provenance server system 602 (e.g., as described before in FIG. 6, FIG. 7, and FIG. 10) for verifying the physical item and receive provenance metadata indicating the authenticity of the physical item, among other types of information that may be included as discussed herein.

Figure 12:
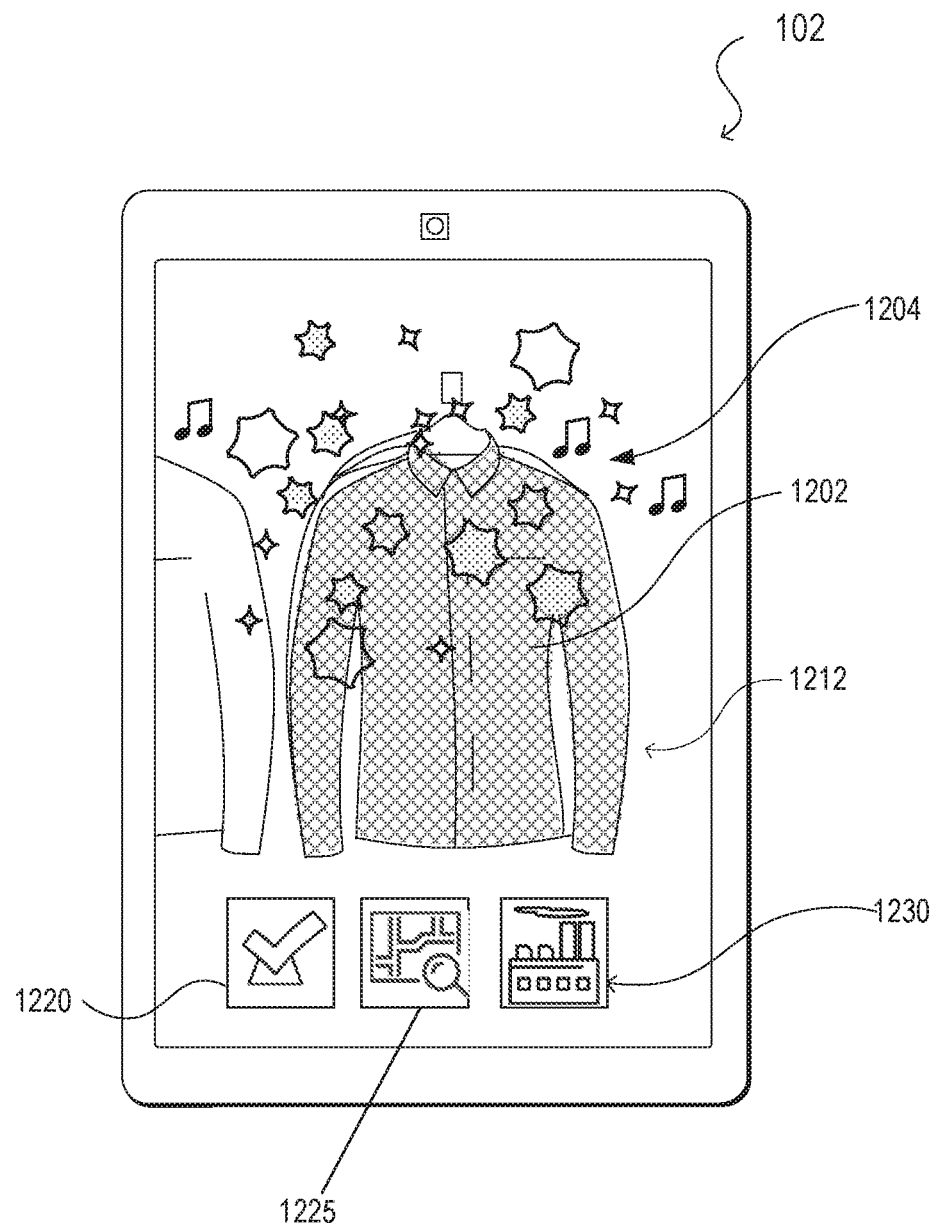
FIG. 12 illustrates an example of providing a media overlay with information indicating verification or authenticity of the physical item described in FIG. 11A and FIG. 11B.

FIG. 12 illustrates an example of providing a media overlay with information indicating verification or authenticity of the physical item 1112 described in FIG. 11A and FIG. 11B.

As illustrated, the client device 102 can provide for display a media overlay 1202, which may include visual and audio content 1204 corresponding to animations, media content, text content, and the like. It is appreciated that the media overlay 1202 displayed by the client device 102 can include audio and visual content and visual effects as described before in FIG. 1 and FIG. 2. In an embodiment, the media overlay 1202 can include, or be utilized in conjunction with, at least one Lenses™ which is described further below.

As further illustrated, the client device 102 can provide for display graphical element 1220, graphical element 1225, and graphical element 1230 (e.g., icons, images, graphical UI objects, and the like) that respectively correspond to an indication of authenticity, provenance information, and manufacturing information. In an example, the user 1102 can provide input to select graphical element 1225 to receive further information regarding provenance information related to a history of recorded ownership of the physical item 1112. As discussed elsewhere herein, information regarding names and/or titles of previous owners, respective time periods of ownership, respective locations, etc., can be provided for display to further indicate authenticity of the physical item 1212, which may also be displayed in conjunction with the media overlay 1202 in FIG. 12. The user 1102 can also provide input to select graphical element 1230 to receive further information regarding manufacturing information related to how the physical item 1112 was manufactured. Examples of manufacturing information can include media content (e.g., videos, images, text, and the like) that is displayed by the client device 102 to inform the user 1102, which may be provided in conjunction with the media overlay 1202 in FIG. 12.

As described above, Lenses™ (e.g., "lens") in accordance with embodiments described herein refer to modifications that may be made to videos or images. This includes both real-time modification which modifies an image as it is captured using a device sensor and then displayed on a screen of the device with the modifications. This also includes modifications to stored content, such as video clips in a gallery that may be modified using Lenses™. For example, in a creator profile with multiple Lenses™, an authorized third-party account may use a single video clip with multiple Lenses™ to see how the different Lenses™ will modify the stored clip. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both).

Data and various systems to use Lenses™ and modify content using this data can thus involve detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g. images or frames of video). Lens data thus refers both to the images, models, and textures used to create transformations in content, as well as to additional modeling and analysis information needed to achieve such transformations with object detection, tracking, and placement.

Real time video processing can be performed with any kind of video data, (e.g. video streams, video files, etc.) saved in a memory of a computerized system of any kind. For example, a user can load video files and save them in a memory of a device, or can generate a video stream using sensors of the device. Additionally, any objects can be processed using Lenses™, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g. using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve: changing color of areas; removing at least some part of areas from the frames of the video stream; including one or more new objects into areas which are based on a request for modification; and modifying or distorting the elements of an area or object. In various embodiments, any combination of such modifications or other similar modifications may be used.

In some embodiments of Lenses™ using face detection, the face is detected on an image with use of a specific face detection algorithm (e.g. Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g. if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device and perform complex image manipulations locally on a client device such as client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on a client device.

In some example embodiments, Lenses™ may be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with the Lenses™, or the Lenses™ may be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and lens selection (e.g. initiation from a content creator user interface) In various embodiments, a modification may be persistent after an initial selection of a modification icon. The user may toggle the modification on or off by tapping or otherwise selecting the face being modified by the transformation system, and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

Figure 13:
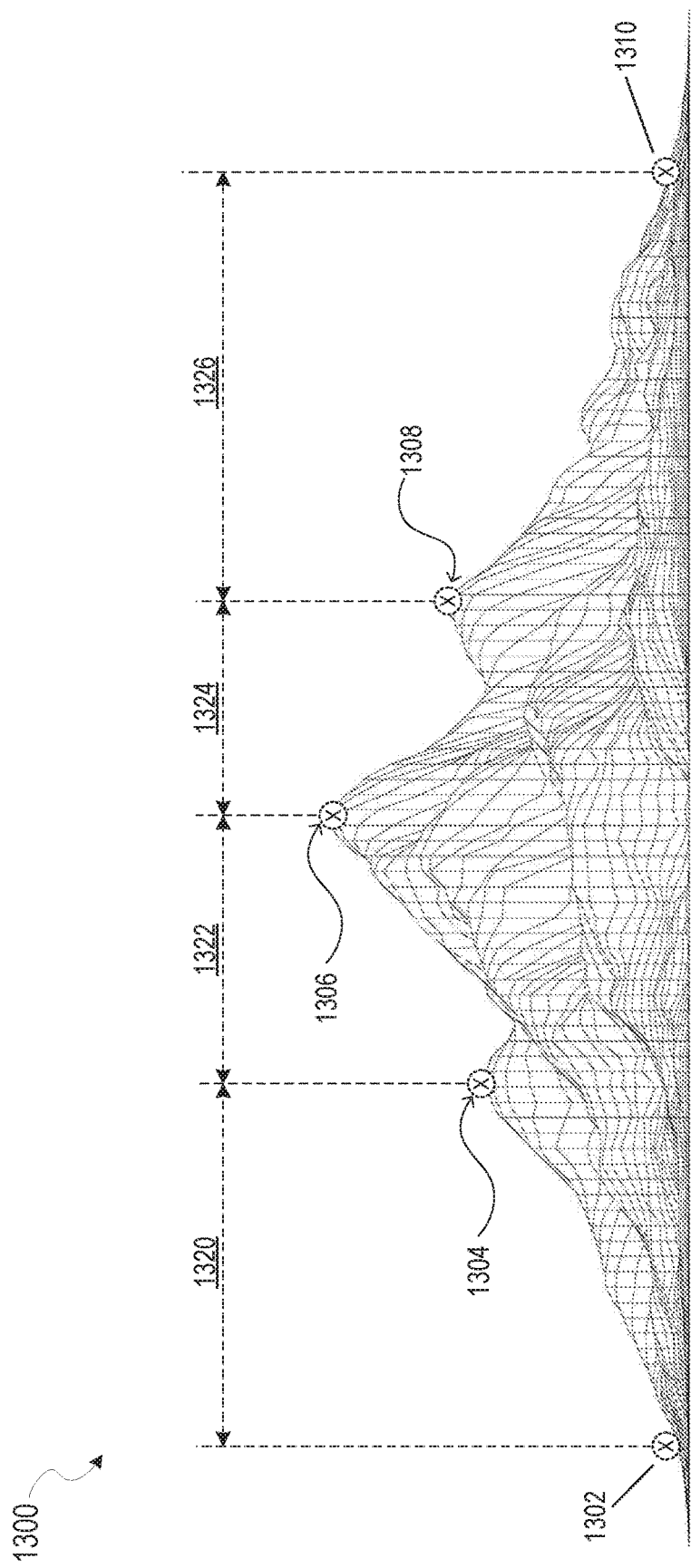
FIG. 13 is an example side profile view of a 3D barcode, according to some example embodiments.

FIG. 13 is an example side profile view of a 3D barcode 1300, according to some example embodiments. As discussed before, in some embodiments, the subject technology supports the utilization a 3D physical object that provide similar features as a 2D barcode (e.g., where information is encoded with 2D patterns/or and other elements) for serving as a physical identification indicator for a given physical item, which is referred to herein as a "3D barcode". It is appreciated that a 3D barcode as referred to herein does not refer to a QR code or 2D image with graphical patterns that mimic a 3D pattern.

A given manufacture of given physical item (e.g., the physical item 1112) can create a 3D barcode for identifying the physical item, which can be created using any appropriate manufacturing process including, but not limited to, 3D printing, injection molding, CNC (computer numeric control) machining, plastic forming, plastic joining, laser sintering, stereolithography, binder jetting, poly-jet, fused deposition modeling, and the like.

In an embodiment, the messaging client application 104, particularly the product verification module 704, recognizes a physical object corresponding to a 3D barcode from captured image data. Further, the messaging client application 104 can generate a 3D mesh as a digital representation of the 3D barcode.

In some software applications (e.g., computer vision or computer graphics), 3D physical objects or surfaces thereof are typically described or represented using models such as 3D meshes, which are sometimes called textured meshes or polygon meshes, that represent both shapes and textures of such objects. In an example, a textured mesh of an object includes two components: 1) a 3D representation of the object defined by vertices and/or edges of the object, and 2) polygonal shapes or faces that extend between such vertices and edges and represent a texture of the object. Thus, a textured mesh defines a volume and an appearance of the object that are utilized by various applications, including the messaging client application 104.

Generating a 3D model of an object (e.g., a textured mesh) from captured image data utilizes machine-driven modeling techniques to capture digital imagery of the object and to generate a physical representation of the object. For example, a digital representation of the physical object may be defined by a set of points in 3D space, which may be obtained from a depth image of the object or other ranging data, or from one or more two-dimensional (or 2D) images of the object, such as by modeling the object using stereo or structure-from-motion (or SFM) algorithms. Using such data, a depth model, such as a point cloud, of the object may be defined for the object, including a set of points that may be described with respect to Cartesian coordinates. In an example, a textured mesh or other 3D model is generated for the object using a visual digital image and the depth model, such as by mapping or patching portions or sectors of the visual digital image to the polygonal shapes defined by the respective points of the depth model.

As illustrated in the 3D barcode 1300, a distance 1320 is between a first vertex 1302 and a second vertex 1304, a distance 1322 is between the second vertex 1304 and a third vertex 1306, a distance 1324 is between the third vertex 1308 to a fourth vertex 1310. A respective set of edges are included between each of the aforementioned vertexes corresponding to the one of the aforementioned distances. In an embodiment, verification metadata can be extracted based at least in part on the respective edges between the respective vertices, which represent an encoding of data. In an example, various values of information (e.g., respective alphanumerical values) are based on the geometry of the 3D barcode 1300 such as a height (e.g., y-axis value), length (e.g., x-axis value), etc. In some embodiments, depth values (e.g., z-axis value) may be utilized in determining verification metadata. In the example of FIG. 13, the portion of the 3D barcode 1300 within the distance 1320 includes respective values associated with a manufacturer ID, the portion of the 3D barcode 1300 with the distance 1322 can include respective values associated with a product ID, and the portion of the 3D barcode 1300 within the distance 1324 and the distance 1326 can include respective values associated with an item unique ID (e.g., serial number, manufacturing information unique to this particular physical item, etc.). It is appreciated, however, that different portions of the 3D barcode 1300, in some embodiments, can be associated with different types of verification metadata and still be within the scope of the subject technology.

In an embodiment, the messaging client application 104 determines whether the recognized object corresponds to a representation of a three-dimensional barcode, the representation of the three-dimensional barcode comprising a textured surface. The messaging client application 104 analyzes the representation of the three-dimensional barcode to recognize a set of features corresponding to information for verifying authenticity of the physical item. The messaging client application 104 transforms the set of features into a three-dimensional mesh, the three-dimensional mesh including a set of vertices and a set of edges. Further, the messaging client application 104 extracts verification metadata from the three-dimensional mesh, the verification metadata including information for verifying whether the physical item is an authentic item. The messaging client application 104 determines a distance between a first feature (e.g., a first respective vertex) and a second feature (e.g., a second respective vertex) from the three-dimensional mesh, the distance corresponding to an encoding of verification metadata. Further, the messaging client application 104 determines respective height values for the aforementioned features which can represent various values from the encoding of verification metadata.

Although for the purposes of explanation, the side profile of the 3D barcode 1300 is illustrated in FIG. 13, it is appreciated that captured image data can be of a different view or perspective of the 3D barcode 1300. In an embodiment, the product verification module 704 (or another appropriate component of the messaging client application 104) can perform image processing operations to transform the image data to a side profile of the 3D barcode 1300. In an embodiment, the aforementioned transformation is not performed, and the messaging client application 104 performs image analysis directly on the captured image data with the different perspective.

FIG. 14 is a flowchart illustrating a method 1400 to extract verification metadata from a physical identification indicator and obtain manufacturer verification information based on the extracted verification metadata, according to certain example embodiments. The method 1400 may be embodied in computer-readable instructions for execution by one or more computer processors such that the operations of the method 1400 may be performed in part or in whole by the messaging client application 104, particularly with respect to respective components of the annotation system 206 described above in FIG. 7; accordingly, the method 1400 is described below by way of example with reference thereto. However, it shall be appreciated that at least some of the operations of the method 1400 may be deployed on various other hardware configurations and the method 1400 is not intended to be limited to the messaging client application 104.

At operation 1402, the image data receiving module 702 receives image data including a representation of a physical item data captured by an optical sensor (e.g., camera) of the client device 102.

At operation 1404, the product verification module 704 analyzes the image data to recognize an object corresponding to an identification indicator of the physical item. In an embodiment, a recognition operation is performed to recognize the representation of the barcode associated with the physical item.

At operation 1406, the product verification module 704 determines whether the identification indicator of the physical item includes a representation of a barcode. In an embodiment, the identification indicator further includes a representation of a Universal Product Code (UPC) corresponding to the physical item.

At operation 1408, the product verification module 704 extracts verification metadata from the representation of the barcode, the verification metadata including information for verifying whether the physical item is an authentic item. In an embodiment, extracting the verification metadata includes determining a manufacturer identifier associated with representation of the barcode, determining a product identifier associated with the representation of the barcode, and determining an item identifier associated with the representation of the barcode.

At operation 1410, the product verification module 704 sends, to a server (e.g., the product verification system 124), the verification metadata to determine manufacturer verification information associated with the verification metadata.

At operation 1412, the product verification module 704 receives, from the server, the manufacturer verification information. In an embodiment, the manufacturer verification information includes a verification uniform resource locator (URL) and a set of verification parameters, the set of verification parameters including at least one of a respective product identifier, a respective item identifier, or location information based at least in part on metadata associated with the image data or global positioning system (GPS) information.

FIG. 15 is a flowchart illustrating a method 1500 of requesting provenance information based on manufacturer verification information associated with a given physical item, which may be performed in conjunction with the method 1400 in FIG. 14, according to certain example embodiments. The method 1500 may be embodied in computer-readable instructions for execution by one or more computer processors such that the operations of the method 1500 may be performed in part or in whole by the messaging client application 104, particularly with respect to respective components of the annotation system 206 described above in FIG. 7; accordingly, the method 1500 is described below by way of example with reference thereto. However, it shall be appreciated that at least some of the operations of the method 1500 may be deployed on various other hardware configurations and the method 1500 is not intended to be limited to the messaging client application 104.

At operation 1502, the product verification module 704 sends, to a second server (e.g., the manufacturer provenance server system 602), the manufacturer verification information and the verification metadata to determine provenance information associated with the physical item, the provenance information including at least information indicating authenticity of the physical item.

At operation 1504, the product verification module 704 receives, from the second server, the provenance information associated with the physical item.

At operation 1506, the rendering module 706 causes display, at a client device (e.g., the client device 102), of a media overlay including the physical item based at least in part on the provenance information, wherein the media overlay includes an indication of authenticity of the physical item. In an embodiment, the provenance information further includes manufacturing information of the physical item, and the rendering module 706 causes display, at the client device, of the manufacturing information based at least in part on the provenance information, the manufacturing information including a uniform resource locator (URL) corresponding to media content associated with a manufacturing process of the physical item. In an embodiment, the provenance information further includes historical information of the physical item, and the rendering module 706 causes display, at the client device, of the historical information, the historical information including provenance metadata of the physical item, the provenance metadata including a record of ownership of the physical item.

Figure 16:
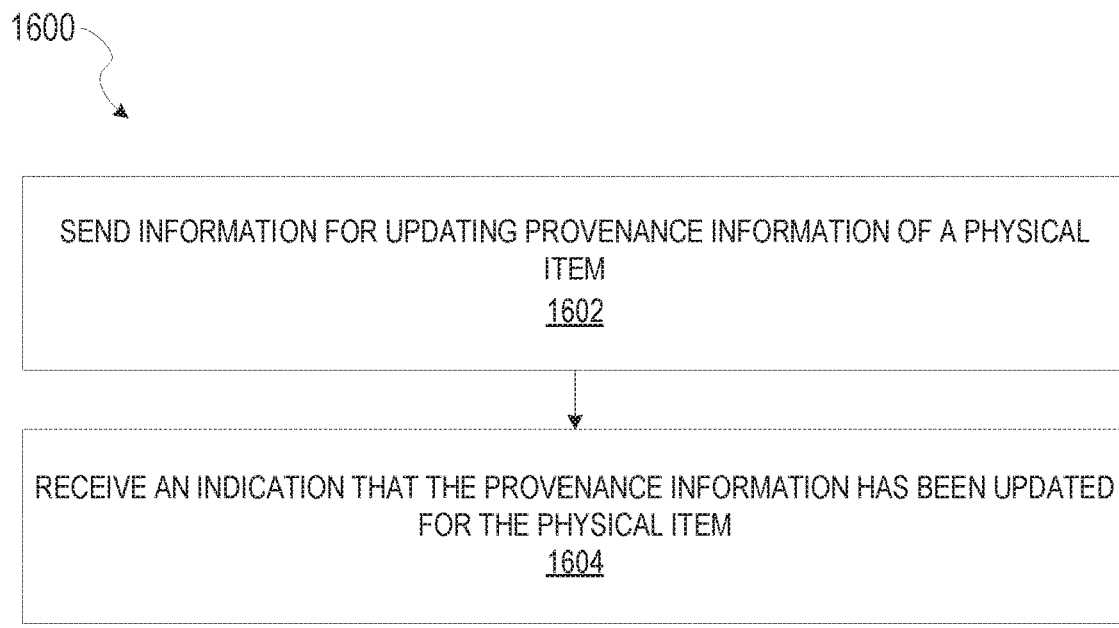
FIG. 16 is a flowchart illustrating a method of updating provenance information associated with a given physical item, according to certain example embodiments.

FIG. 16 is a flowchart illustrating a method 1600 of updating provenance information associated with a given physical item, according to certain example embodiments. The method 1600 may be embodied in computer-readable instructions for execution by one or more computer processors such that the operations of the method 1600 may be performed in part or in whole by the messaging client application 104, particularly with respect to respective components of the annotation system 206 described above in FIG. 7; accordingly, the method 1600 is described below by way of example with reference thereto. However, it shall be appreciated that at least some of the operations of the method 1600 may be deployed on various other hardware configurations and the method 1600 is not intended to be limited to the messaging client application 104.

In some instances, a user may wish to update provenance information associated with a given physical item. For example, when the physical item is purchased a new owner, provenance information for the physical item can be updated to keep information related to the physical item current with the latest transaction. In particular, information related to the new owner, new location of the physical item, etc., can be uploaded to the manufacturer provenance server system 602 in accordance to the example described in FIG. 16.

At operation 1602, the product verification module 704 sends, to a second server (e.g., the manufacturer provenance server system 602), information for updating provenance information of a physical item. At the manufacturer provenance server system 602, the database 620 can be updated with the updated provenance information from the product verification module 704 (e.g., by inserting a new row in the appropriate table associated with the particular physical item).

At operation 1604, the product verification module 704 receives, from the second server, an indication that the provenance information has been updated for the physical item. In an example, confirmation of the update of the provenance information can result in the client device 102 causing display of a particular media overlay indicating the provenance information was updated.

Figure 17:
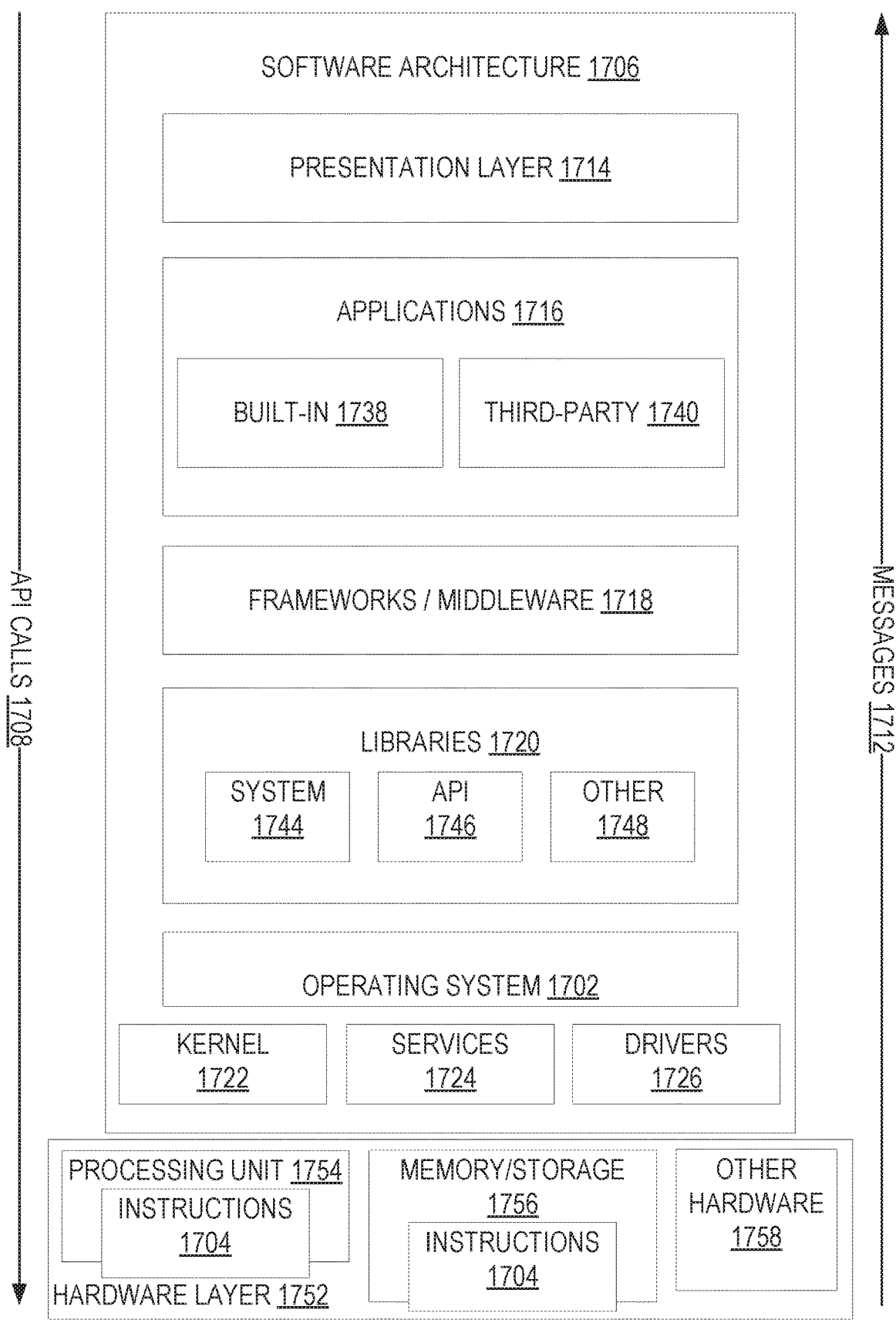
FIG. 17 is block diagram showing a software architecture within which the present disclosure may be implemented, in accordance with some example embodiments.

FIG. 17 is a block diagram illustrating an example software architecture 1706, which may be used in conjunction with various hardware architectures herein described. FIG. 17 is a non-limiting example of a software architecture and it will be appreciated that many other architectures may be implemented to facilitate the functionality described herein. The software architecture 1706 may execute on hardware such as machine 1800 of FIG. 18 that includes, among other things, processors 1804, memory 1814, and (input/output) I/O components 1818. A representative hardware layer 1752 is illustrated and can represent, for example, the machine 1800 of FIG. 18. The representative hardware layer 1752 includes a processing unit 1754 having associated executable instructions 1704. Executable instructions 1704 represent the executable instructions of the software architecture 1706, including implementation of the methods, components, and so forth described herein. The hardware layer 1752 also includes memory and/or storage modules memory/storage 1756, which also have executable instructions 1704. The hardware layer 1752 may also comprise other hardware 1758.

In the example architecture of FIG. 17, the software architecture 1706 may be conceptualized as a stack of layers where each layer provides particular functionality. For example, the software architecture 1706 may include layers such as an operating system 1702, libraries 1720, frameworks/middleware 1718, applications 1716, and a presentation layer 1714. Operationally, the applications 1716 and/or other components within the layers may invoke API calls 1708 through the software stack and receive a response as in response to the API calls 1708. The layers illustrated are representative in nature and not all software architectures have all layers. For example, some mobile or special purpose operating systems may not provide a frameworks/middleware 1718, while others may provide such a layer. Other software architectures may include additional or different layers.

The operating system 1702 may manage hardware resources and provide common services. The operating system 1702 may include, for example, a kernel 1722, services 1724, and drivers 1726. The kernel 1722 may act as an abstraction layer between the hardware and the other software layers. For example, the kernel 1722 may be responsible for memory management, processor management (e.g., scheduling), component management, networking, security settings, and so on. The services 1724 may provide other common services for the other software layers. The drivers 1726 are responsible for controlling or interfacing with the underlying hardware. For instance, the drivers 1726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1720 provide a common infrastructure that is used by the applications 1716 and/or other components and/or layers. The libraries 1720 provide functionality that allows other software components to perform tasks in an easier fashion than to interface directly with the underlying operating system 1702 functionality (e.g., kernel 1722, services 1724 and/or drivers 1726). The libraries 1720 may include system libraries 1744 (e.g., C standard library) that may provide functions such as memory allocation functions, string manipulation functions, mathematical functions, and the like. In addition, the libraries 1720 may include API libraries 1746 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1720 may also include a wide variety of other libraries 1748 to provide many other APIs to the applications 1716 and other software components/modules.

The frameworks/middleware 1718 (also sometimes referred to as middleware) provide a higher-level common infrastructure that may be used by the applications 1716 and/or other software components/modules. For example, the frameworks/middleware 1718 may provide various graphic user interface (GUI) functions, high-level resource management, high-level location services, and so forth. The frameworks/middleware 1718 may provide a broad spectrum of other APIs that may be used by the applications 1716 and/or other software components/modules, some of which may be specific to a particular operating system 1702 or platform.

The applications 1716 include built-in applications 1738 and/or third-party applications 1740. Examples of representative built-in applications 1738 may include, but are not limited to, a contacts application, a browser application, a book reader application, a location application, a media application, a messaging application, and/or a game application. Third-party applications 1740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1740 may invoke the API calls 1708 provided by the mobile operating system (such as operating system 1702) to facilitate functionality described herein.

The applications 1716 may use built in operating system functions (e.g., kernel 1722, services 1724 and/or drivers 1726), libraries 1720, and frameworks/middleware 1718 to create user interfaces to interact with users of the system. Alternatively, or additionally, in some systems interactions with a user may occur through a presentation layer, such as presentation layer 1714. In these systems, the application/component "logic" can be separated from the aspects of the application/component that interact with a user.

Figure 18:
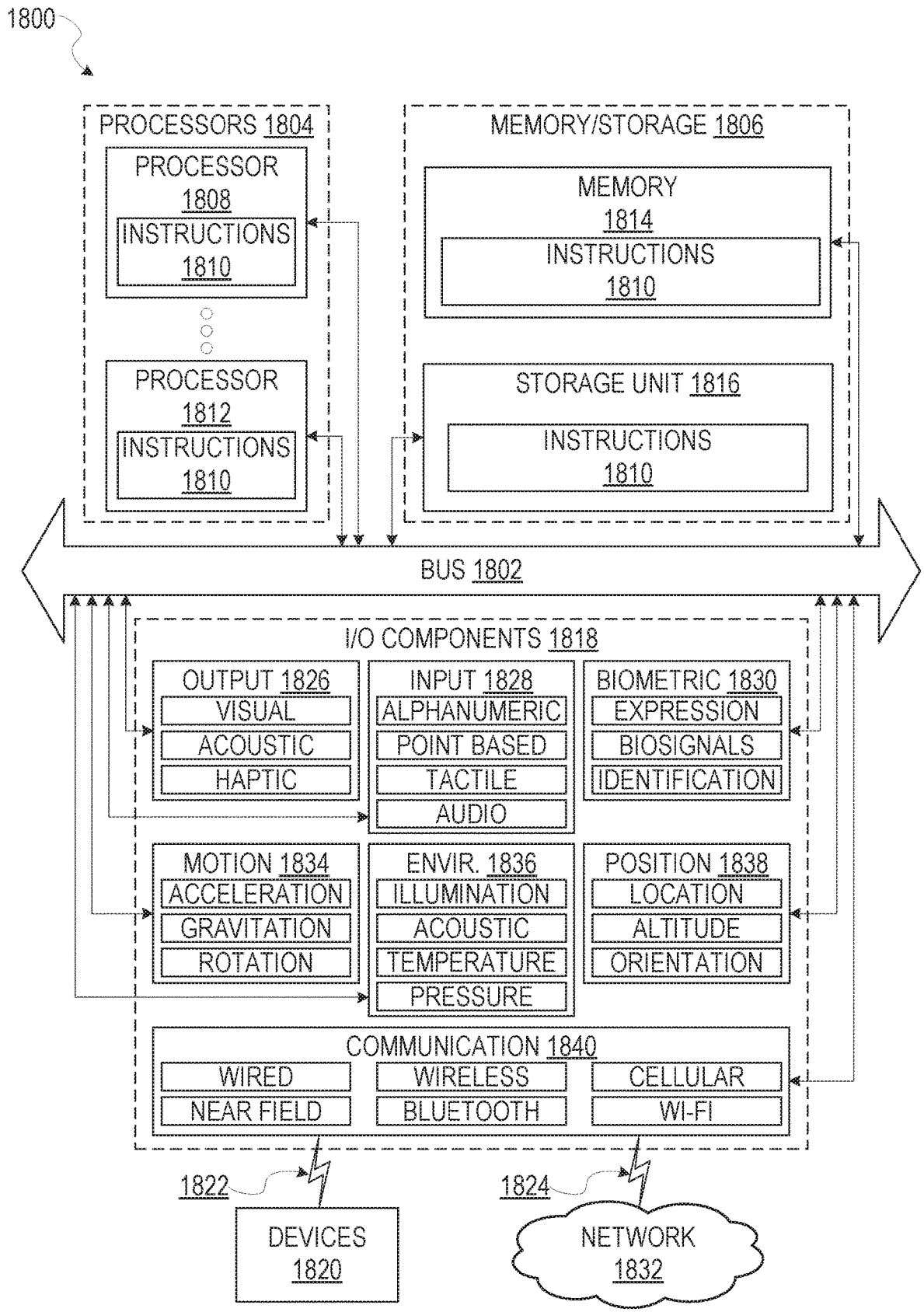
FIG. 18 is a diagrammatic representation of a machine, in the form of a computer system within which a set of instructions may be executed for causing the machine to perform any one or more of the methodologies discussed, in accordance with some example embodiments.

FIG. 18 is a block diagram illustrating components of a machine 1800, according to some example embodiments, able to read instructions from a machine-readable medium (e.g., a machine-readable storage medium) and perform any one or more of the methodologies discussed herein. Specifically, FIG. 18 shows a diagrammatic representation of the machine 1800 in the example form of a computer system, within which instructions 1810 (e.g., software, a program, an application, an applet, an app, or other executable code) for causing the machine 1800 to perform any one or more of the methodologies discussed herein may be executed. As such, the instructions 1810 may be used to implement modules or components described herein. The instructions 1810 transform the general, non-programmed machine 1800 into a particular machine 1800 programmed to carry out the described and illustrated functions in the manner described. In alternative embodiments, the machine 1800 operates as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1810, sequentially or otherwise, that specify actions to be taken by machine 1800. Further, while only a single machine 1800 is illustrated, the term "machine" shall also be taken to include a collection of machines that individually or jointly execute the instructions 1810 to perform any one or more of the methodologies discussed herein.

The machine 1800 may include processors 1804, memory/storage 1806, and I/O components 1818, which may be configured to communicate with each other such as via a bus 1802. The memory/storage 1806 may include a memory 1814, such as a main memory, or other memory storage, and a storage unit 1816, both accessible to the processors 1804 such as via the bus 1802. The storage unit 1816 and memory 1814 store the instructions 1810 embodying any one or more of the methodologies or functions described herein. The instructions 1810 may also reside, completely or partially, within the memory 1814, within the storage unit 1816, within at least one of the processors 1804 (e.g., within the processor's cache memory), or any suitable combination thereof, during execution thereof by the machine 1800. Accordingly, the memory 1814, the storage unit 1816, and the memory of processors 1804 are examples of machine-readable media.

The I/O components 1818 may include a wide variety of components to receive input, provide output, produce output, transmit information, exchange information, capture measurements, and so on. The specific I/O components 1818 that are included in a particular machine 1800 will depend on the type of machine. For example, portable machines such as mobile phones will likely include a touch input device or other such input mechanisms, while a headless server machine will likely not include such a touch input device. It will be appreciated that the I/O components 1818 may include many other components that are not shown in FIG. 18. The I/O components 1818 are grouped according to functionality merely for simplifying the following discussion and the grouping is in no way limiting. In various example embodiments, the I/O components 1818 may include output components 1826 and input components 1828. The output components 1826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the/O components 1818 may include biometric components 1830, motion components 1834, environmental components 1836, or position components 1838 among a wide array of other components. For example, the biometric components 1830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1834 may include acceleration sensor components (e.g., accelerometer), gravitation sensor components, rotation sensor components (e.g., gyroscope), and so forth. The environmental components 1836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1818 may include communication components 1840 operable to couple the machine 1800 to a network 1832 or devices 1820 via coupling 1824 and coupling 1822, respectively. For example, the communication components 1840 may include a network interface component or other suitable device to interface with the network 1832. In further examples, communication components 1840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1520 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as, location via Internet Protocol (IP) geo-location, location via Wi-Fi® signal triangulation, location via detecting a NFC beacon signal that may indicate a particular location, and so forth.

What is claimed is:

1. A method, comprising:
    analyzing image data to recognize an object corresponding to an identification indicator of a physical item;
    determining whether the recognized object corresponds to a representation of a three-dimensional barcode, the representation of the three-dimensional barcode comprising a textured surface;
    analyzing the representation of the three-dimensional barcode to recognize a set of features corresponding to information for verifying authenticity of the physical item;
    transforming the set of features into a three-dimensional mesh, the three-dimensional mesh including a set of vertices and a set of edges;
    extracting verification metadata from the three-dimensional mesh, the verification metadata including information for verifying whether the physical item is an authentic item
    receiving manufacturer verification information based at least in part on the verification metadata;
    receiving provenance information associated with the physical item based at least in part on the manufacturer verification information and the verification metadata; and
    causing display of a media overlay including the physical item based at least in part on the provenance information; wherein the media overlay includes an indication of authenticity of the physical item.

2. The method of claim 1, further comprising:
    receiving image data including a representation of a physical item; and
    determining whether the identification indicator of the physical item includes a representation of a barcode.

3. The method of claim 1, further comprising:
    sending the verification metadata to determine manufacturer verification information associated with the verification metadata.

4. The method of claim 1, further comprising:
    sending the manufacturer verification information and the verification metadata to determine provenance information associated with the physical item, the provenance information including at least information indicating authenticity of the physical item.

5. The method of claim 4, wherein the provenance information further includes manufacturing information of the physical item, and further comprising:
    causing display of the manufacturing information based at least in part on the provenance information.

6. The method of claim 5, wherein the manufacturing information comprises a uniform resource locator (URL) corresponding to media content associated with a manufacturing process of the physical item.

7. The method of claim 1, wherein the provenance information further includes historical information of the physical item, and further comprising:
    causing display of the historical information, the historical information comprising provenance metadata of the physical item, the provenance metadata including a record of ownership of the physical item.

8. The method of claim 1, wherein the manufacturer verification information includes a verification uniform resource locator (URL) and a set of verification parameters, the set of verification parameters including at least one of a respective product identifier, a respective item identifier, or location information based at least in part on metadata associated with the image data or global positioning system (GPS) information.

9. The method of claim 1, wherein extracting verification metadata from the three-dimensional mesh further comprises:
    determining a distance between a first feature and a second feature from the three-dimensional mesh, the distance corresponding to an encoding of verification metadata.

10. A system comprising:
    a processor;
    a memory including instructions that, when executed by the processor, cause the processor to perform operations comprising:
    analyzing image data to recognize an object corresponding to an identification indicator of a physical item;
    determining whether the recognized object corresponds to a representation of a three-dimensional barcode, the representation of the three-dimensional barcode comprising a textured surface;
    analyzing the representation of the three-dimensional barcode to recognize a set of features corresponding to information for verifying authenticity of the physical item;
    transforming the set of features into a three-dimensional mesh, the three-dimensional mesh including a set of vertices and a set of edges;

extracting verification metadata from the three-dimensional mesh, the verification metadata including information for verifying whether the physical item is an authentic item;

receiving manufacturer verification information based at least in part on the verification metadata;

receiving provenance information associated with the physical item based at least in part on the manufacturer verification information and the verification metadata; and causing display of a media overlay including the physical item based at least in part on the provenance information, wherein the media overlay includes an indication of authenticity of the physical item.

11. The system of claim 10, wherein the memory includes further instructions, which further cause the processor to perform further operations comprising:

receiving image data including a representation of a physical item; and determining whether the identification indicator of the physical item includes a representation of a barcode.

12. The system of claim 10, wherein the memory includes further instructions, which further cause the processor to perform further operations comprising:

sending the verification metadata to determine manufacturer verification information associated with the verification metadata.

13. The system of claim 10, wherein the memory includes further instructions, which further cause the processor to perform further operations comprising:

sending the manufacturer verification information and the verification metadata to determine provenance information associated with the physical item, the provenance information including at least information indicating authenticity of the physical item.

14. The system of claim 13, wherein the provenance information further includes manufacturing information of the physical item, and further comprising:

causing display of the manufacturing information based at least in part on the provenance information.

15. The system of claim 14, wherein the manufacturing information comprises a uniform resource locator (URL) corresponding to media content associated with a manufacturing process of the physical item.

16. The system of claim 10, wherein the provenance information further includes historical information of the physical item, and wherein the memory includes further instructions, which further cause the processor to perform further operations comprising:

causing display of the historical information, the historical information comprising provenance metadata of the physical item, the provenance metadata including a record of ownership of the physical item.

17. A non-transitory computer-readable medium comprising instructions, which when executed by a computing device, cause the computing device to perform operations comprising:

analyzing image data to recognize an object corresponding to an identification indicator of a physical item;

determining whether the recognized object corresponds to a representation of a three-dimensional barcode, the representation of the three-dimensional barcode comprising a textured surface;

analyzing the representation of the three-dimensional barcode to recognize a set of features corresponding to information for verifying authenticity of the physical item;

transforming the set of features into a three-dimensional mesh, the three-dimensional mesh including a set of vertices and a set of edges;

extracting verification metadata from the three-dimensional mesh, the verification metadata including information for verifying whether the physical item is an authentic item;

receiving manufacturer verification information based at least in part on the verification metadata;

receiving provenance information associated with the physical item based at least in part on the manufacturer verification information and the verification metadata; and causing display of a media overlay including the physical item based at least in part on the provenance information, wherein the media overlay includes an indication of authenticity of the physical item.

* * * * *

UNITED STATES PATENT AND TRADEMARK OFFICE
CERTIFICATE OF CORRECTION

PATENT NO. : 11,295,101 B2
APPLICATION NO. : 16/934305
DATED : April 5, 2022
INVENTOR(S) : Monroy-Hernandez Page 1 of 1

It is certified that error appears in the above-identified patent and that said Letters Patent is hereby corrected as shown below:

In the Claims

In Column 33, Line 57, in Claim 1, after "item", insert --;--

In Column 33, Lines 65-66, in Claim 1, delete "information;" and insert --information,-- therefor Signed and Sealed this
Thirtieth Day of August, 2022

Katherine Kelly Vidal
*Director of the United States Patent and Trademark Office*